United States Patent [19]

Gower

[11] Patent Number: 4,502,555

[45] Date of Patent: Mar. 5, 1985

[54] PORTABLE WEIGHING SYSTEM FOR AIRCRAFT

[75] Inventor: David Gower, Toms River, N.J.

[73] Assignee: McDonnell Douglas Corporation, Long Beach, Calif.

[21] Appl. No.: 532,851

[22] Filed: Sep. 16, 1983

[51] Int. Cl.$^3$ ............... G01G 19/02; G01M 1/12; G06F 15/20

[52] U.S. Cl. .................... 177/25; 177/199; 177/211; 73/65; 364/463; 364/554; 364/567

[58] Field of Search ............... 177/211, 199, 4, 25; 364/554, 567, 568, 573, 463; 73/1 B, 65, 802

[56] References Cited

U.S. PATENT DOCUMENTS

| | | | |
|---|---|---|---|
| 2,735,291 | 2/1956 | Quinn | 364/567 X |
| 3,584,503 | 6/1971 | Senour | 364/567 X |
| 4,121,049 | 10/1978 | Roeber | 177/211 X |
| 4,313,509 | 2/1982 | Engels | 177/50 |
| 4,423,486 | 12/1983 | Berner | 177/25 X |
| 4,446,524 | 5/1984 | Wendt | 364/463 |

OTHER PUBLICATIONS

B. J. Hawkins, "Stan—For Aircraft Take-Off Weight and Balance", Instruments and Control Systems, vol. 89, Feb. 1965, pp. 89-93.

Primary Examiner—E. A. Goldberg
Assistant Examiner—Fred L. Kampe
Attorney, Agent, or Firm—Gregory A. Cone; George W. Finch; Donald L. Royer

[57] ABSTRACT

This portable weighing system for aircraft includes a plurality of individual load cells which are connected to a central computing and display unit capable of storing dimensional characteristics of commonly encountered aircraft. The computer within the central unit compensates by its programming for nonlinearities in the response of the load cells. The output display can include aircraft gross weight, center of gravity (optionally displayed as percentage of the mean aerodynamic chord). Interactive capability is also provided to facilitate input of aircraft dimensional characteristics which are not already contained within the memory of the central unit.

1 Claim, 37 Drawing Figures

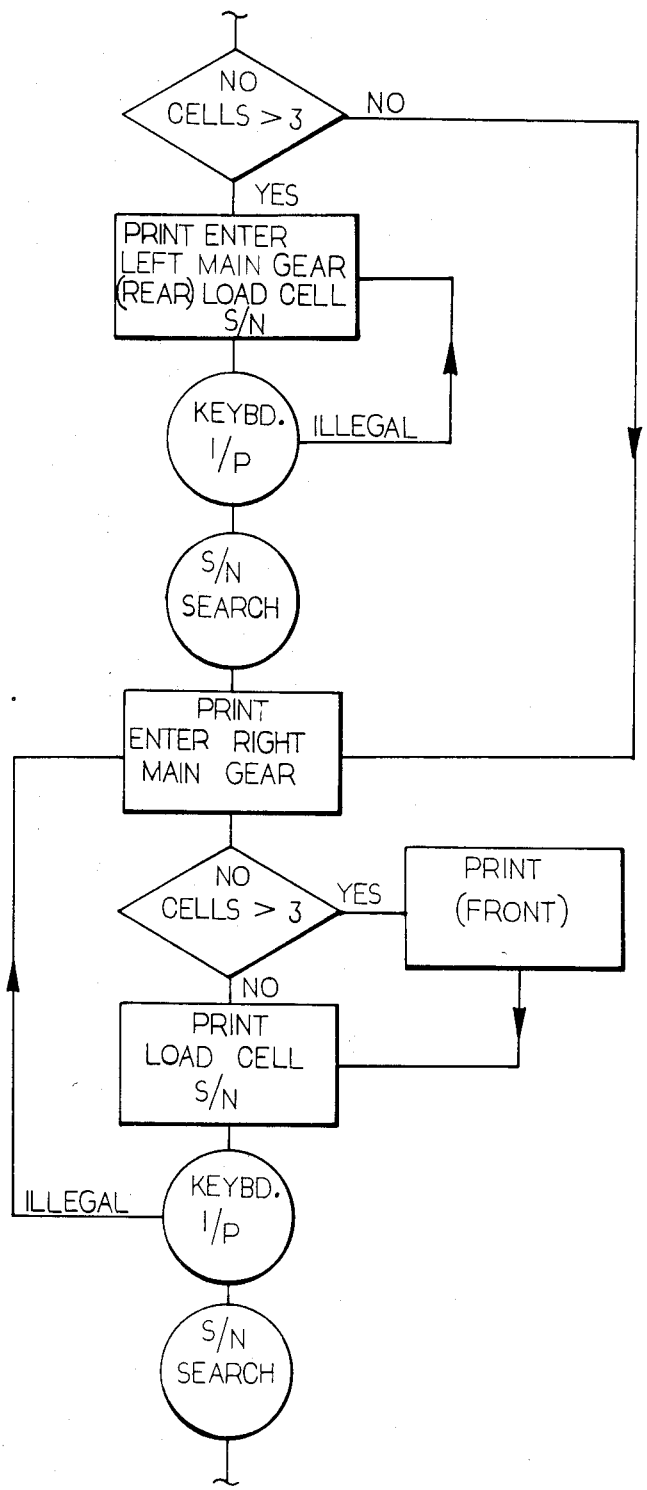
FIG. 15B1

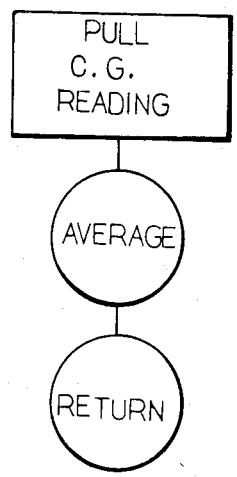
FIG. 23
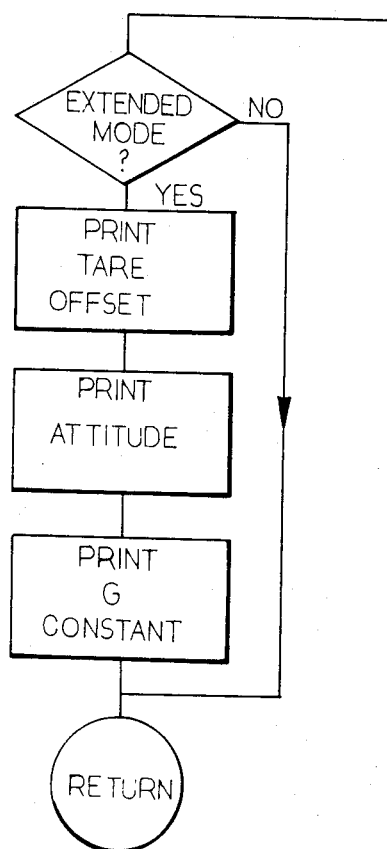
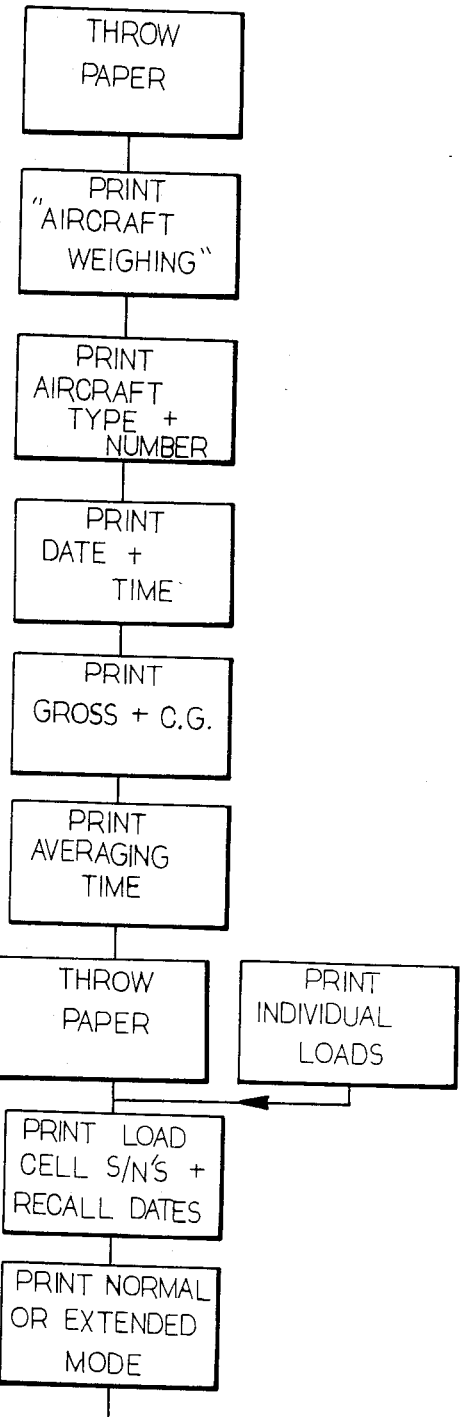
FIG. 24

PORTABLE WEIGHING SYSTEM FOR AIRCRAFT

BACKGROUND OF THE INVENTION

This invention relates to a weighing system, and more particularly, to a system that determines the gross weight and center of gravity (CG) of an object.

Most of the time consumed in weighing system routine maintenance is devoted to calibrating the strain-gauge type load cells used in prior art systems. As a load cell ages, its nonlinearity also increases. Prior art systems require load cell linearity of better than 0.05% of full scale to ensure an accurate answer. They use alternating current to power the load cells. Although this simplifies the detection circuitry design, the reading is affected by the cable capacitance. This in turn requires that the entire weighing system has to be returned to the shop as a whole for calibration, which is very inconvenient.

The cells in prior art systems, in addition, are generally excited one at a time during operation as there is only one detection circuit which is manually switched to read the selected cell. Since a cell requires a 30-minute stabilization period under power to balance internal self heating effects, a precision weighing routine for a system with four load cells will take at least two hours.

Gross weight and center of gravity are very important values, in particular for aircraft applications, since they allow for fast pre-flight trimming of an aircraft's weight. Because only one cell can be read at a time, prior art systems are unable to provide automatic calculation of these values; manual calculation is necessary.

Also, the prior art systems are generally based on a technology at least 10 years old. This technology does not contemplate self-diagnostic routines for verifying the system operating condition.

Therefore, it is an object of this invention to provide a weighing system that automatically determines the center of gravity and gross weight.

Another object of this invention is to provide a weighing system capable of providing highly accurate results even with highly nonlinear load cells.

A further object of this invention is to provide a weighing system whose operating condition can be easily verified and manipulated by any operator.

Still another object of this invention is to provide a weighing system capable of determining weight either with stored memory data or manually keyed data.

SUMMARY OF THE INVENTION

This invention accomplishes these and other objects by providing a weighing system which includes a multiplicity of load cells to weigh an object simultaneously at different portions of the body. These load cells are connected to a weighing unit having a small printer, liquid crystal displays, a keyboard and a microprocessor. This invention is also characterized by a conversational interaction between the operator and the weighing unit.

This system features several other advances over the prior art. The linearity of the load cells required to produce an accurate final weighing result is considerably reduced. Thus, highly nonlinear load cells, which in prior art systems have to be replaced, may be used. Also, when a cell requires recalibration or repair, there is no need to return the whole system unit to the shop, only the cell itself since cable capacitance is not a factor.

Since the cells are excited simultaneously, the weighing time is reduced by a factor of the number of cells. Larger objects requiring more than four load cells can also be weighed because the number of cells in one embodiment of this system may be expanded to eight. The capability of this system to automatically calculate the gross weight and center of gravity allows, in aircraft weighing, for the rapid trimming of an aircraft's weight prior to flight. Self-diagnostic routines, allowing even inexperienced operators to verify the system operating condition, are possible by using this system. In this system, the final weighing results require that the load cells exhibit repeatable characteristics rather than the strict linearity necessary in prior art systems. Consequently, the load cells are allowed to be highly nonlinear. Because up to 16 calibration coefficients might be stored in the preferred embodiment system, its set up time is reduced, and operator errors resulting from incorrect zero balances and manual data entry are eliminated. The detailed instructions given to the operator by the system printer reduce human errors during the operation. Since most of the internal functions are of a digital nature, the amount of calibration required is minimal. Also, the broad built-in diagnostics assure minimum checkout and calibration of the system. The possible tests available with these diagnostics are analog input scan, single analog input conversion, RAM check, ROM check, printer test, display test and keyboard test. Consequently, the "down-time" of the system is kept to a minimum.

Another advantage of this invention is the system flexibility. It can weigh and give an output in pounds or kilograms. With minor software changes, the incoming voltages in digital form can be converted and processed in any format desired. Also, for aircraft weighing, this system accepts changes in gravitational constants and corrects the CG for nose up/nose down aircraft attitude. When weighing an aircraft, the centerline of the fuselage may not be exactly parallel to the ground, due to either landing gear strut extension, landing gear strut length differences or nonlevel ground. The difference, expressed as an angle, is the nose up/nose down attitude of the aircraft. If the aircraft is rotated about the point of CG such that the nose is lower than the tail, the aircraft is nose down. This causes an error in the CG position, which will appear to be further forward than it actually is, due to the increased weight on the nose gear. If the aircraft is rotated about the point of CG such that the nose is higher than the tail, the aircraft is nose up. This causes an error in the CG position, which will appear to be further back than it actually is, due to the decreased weight on the nose gear. By measuring the nose up/nose down attitude, it is possible to correct the CG position to give an accurate measurement.

Since the invention uses direct current to power the load cells, cable capacitance is no longer a factor affecting system measurement readings. The load calibration is independent of the capacitance in the cables, and a worn out cable can be replaced without affecting the load cell calibration. Also, it is no longer necessary to send in both the load cell and the cable when the cell needs calibration.

BRIEF DESCRIPTION OF THE DRAWINGS

FIGS. 7 to 24 are consecutive segments of a flow chart of a program written in Motorola MC 6800 Assembly Language that provides the instructions of the invention.

DETAILED DESCRIPTION OF THE INVENTION

Figure 1:
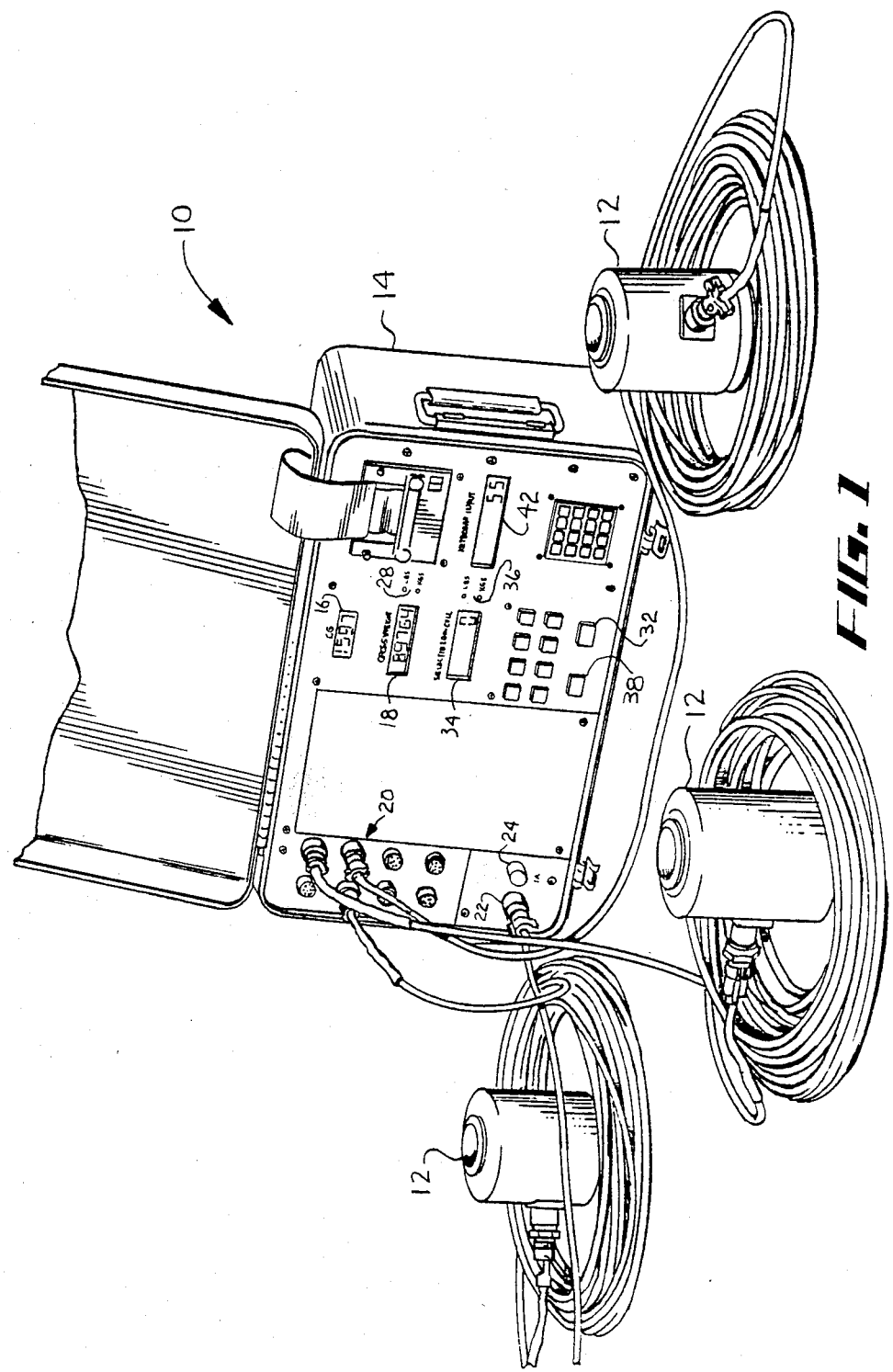
FIG. 1 is an isometric pictorial view of the weighing system including the load cells.
Figure 2:
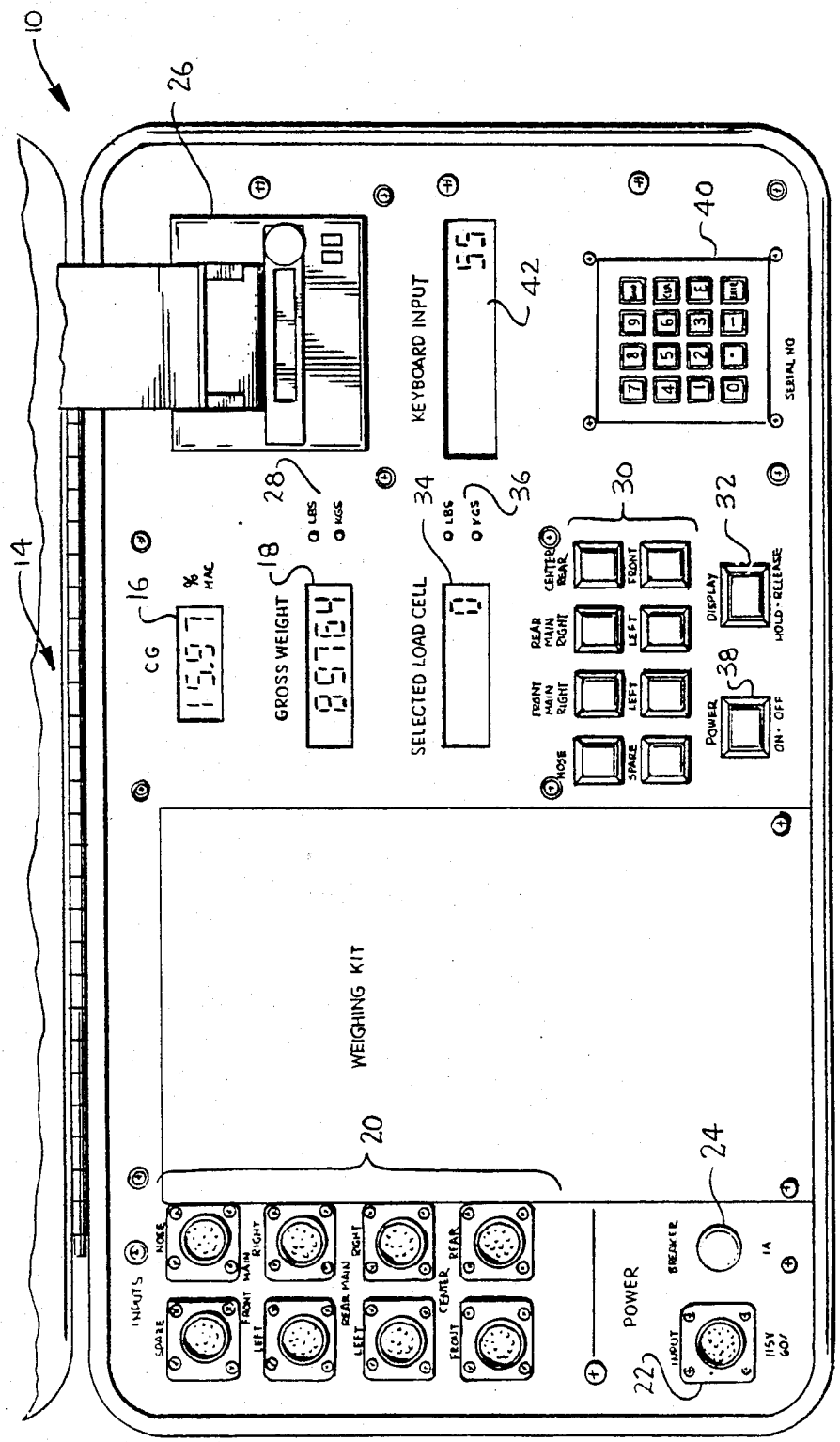
FIG. 2 is a front pictorial view of the faceplate of the weighing unit.

An embodiment of the invention includes a weighing unit to which all load cells are connected. Referring to FIG. 1, the weighing system 10 comprises up to eight load cells 12, three of which are shown, and a weighing unit 14, to which the cells 12 are connected. FIG. 2 illustrates the weighing unit 14, which contains two sections. The first section includes eight load cell inputs 20, a power input 22 and a circuit breaker 24. The second section, which is called the operator interface, includes a small printer 26 and a 16-pad keyboard 40, used by the operator to enter the data required. An eight-digit liquid crystal display (LCD) 42 above the keyboard 40 allows the operator to verify the data he is keying. During the weighing mode, the number of weighings performed by the system is displayed in LCD 42. LCDs 16, 18 and 34 are located to the left of printer 26. LCD 16 is a four-digit display, which displays the average CG in percentage of Mean Aerodynamic Chord (% MAC). In aircraft applications, MAC constitutes a reference point to determine the position of the center of gravity of the aircraft in flight. Reference points which exist for ground based measurement (e.g., the landing gear) generally have no relevance as reference points in flight. In flight, an aircraft pivots about the wing. The exact point on the wing about which it pivots is the center of gravity of the aircraft in flight. Since this point is usually between the leading and trailing edges of the wing, it can be expressed as a percentage of that distance. The distance between the leading and trailing edge is the chord of the wing. This physical distance may not be exactly equivalent to the aerodynamic distance, and hence the effective mean aerodynamic chord is used as a basis for this measurement. LCD 18, which is a six-digit display located beneath LCD 16, displays the average gross weight; and LCD 34, which is another six-digit display located beneath LCD 18, displays the load on a selected cell. Indicators 28 and 36 are located to the right of LCDs 18 and 34. These indicators show the unit of weight used (pounds or kilograms). There are eight load selector switches 30, which illuminate to indicate the selected cell whose load is being displayed in LCD 34. A power switch 38 to turn on and off the system is located below the load selector switches 30. Display hold switch 32, which holds all displays and prevents any automatic updating, is located to the right of switch 38. This feature allows manual recording of data, if necessary. Switch 38 illuminates in green when the unit is on, while switch 32 illuminates in red for the display hold mode.

Figure 3:
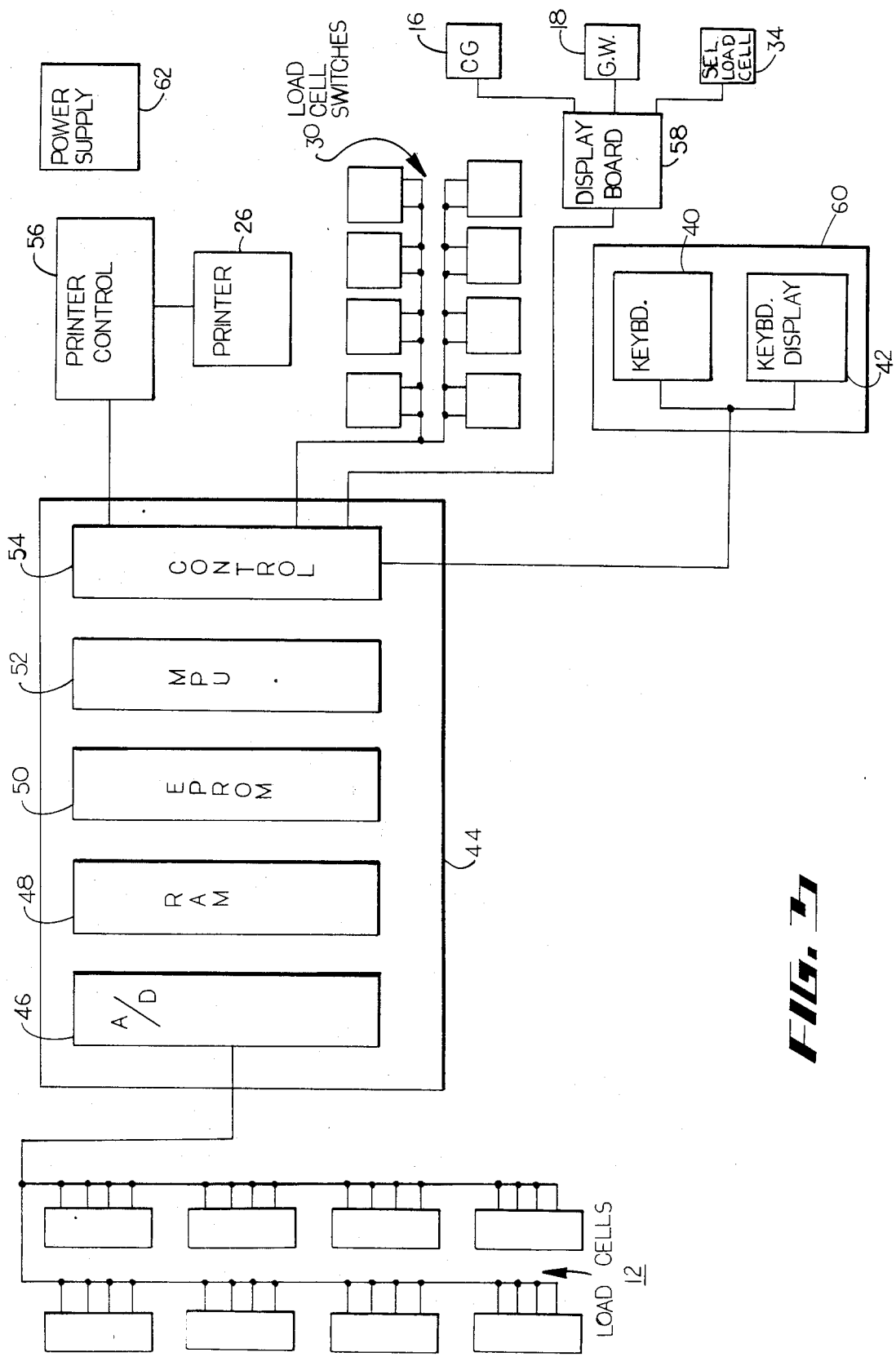
FIG. 3 is a simplified schematic diagram of the weighing system.

FIG. 3 illustrates a simplified block diagram of the weighing system including the various electronic boards and interconnections. A mother board 44 links an analog to digital converter board 46, a 16K static Random Access Memory (RAM) board 48, a 32K Erasable Programmable Read Only Memory (EPROM) board 50, a Microprocessor Unit (MPU) board 52, and a control board 54. Board 46 includes a converter and a set of input multiplexers. This will allow up to 16 analog channels to be sampled and digitized, converting the voltages from load cells 12 into 12-bit binary counts. These binary counts are subsequently processed by the microprocessor in order to display the load in engineering units. Board 54 interfaces the microprocessor in board 52 to the LCDs 16, 18, 34 and 42 and keyboard 40, shown in FIG. 2. An additional function of this board is to store the load cells 12 calibration constants and a set of object dimensions. Load selector switches 30 in FIG. 2 are connected to board 54. For this embodiment of the weighing system, the dimensions stored include those for the DC-8, DC-9 and DC-10 series of airplanes manufactured by Douglas Aircraft Company, a division of McDonnell Douglas Corporation. Other airplane dimensions can be stored depending on airline fleet characteristics. Board 48 stores variables while board 50 stores the microprocessor program stored in read-only-memory. A printer control board 56 interfaces the microprocessor to printer 26 via the board 54 and provides all necessary printer control signals. A display board 58 drives the LCDs 16, 18 and 34 in FIG. 2. A keyboard board 60 drives the keyboard input LCD 42 in FIG. 2, and connects the keyboard 40 in FIG. 2 to control board 54. The various separate power supplies and regulators are shown fuctionally as block 62.

Figure 4:
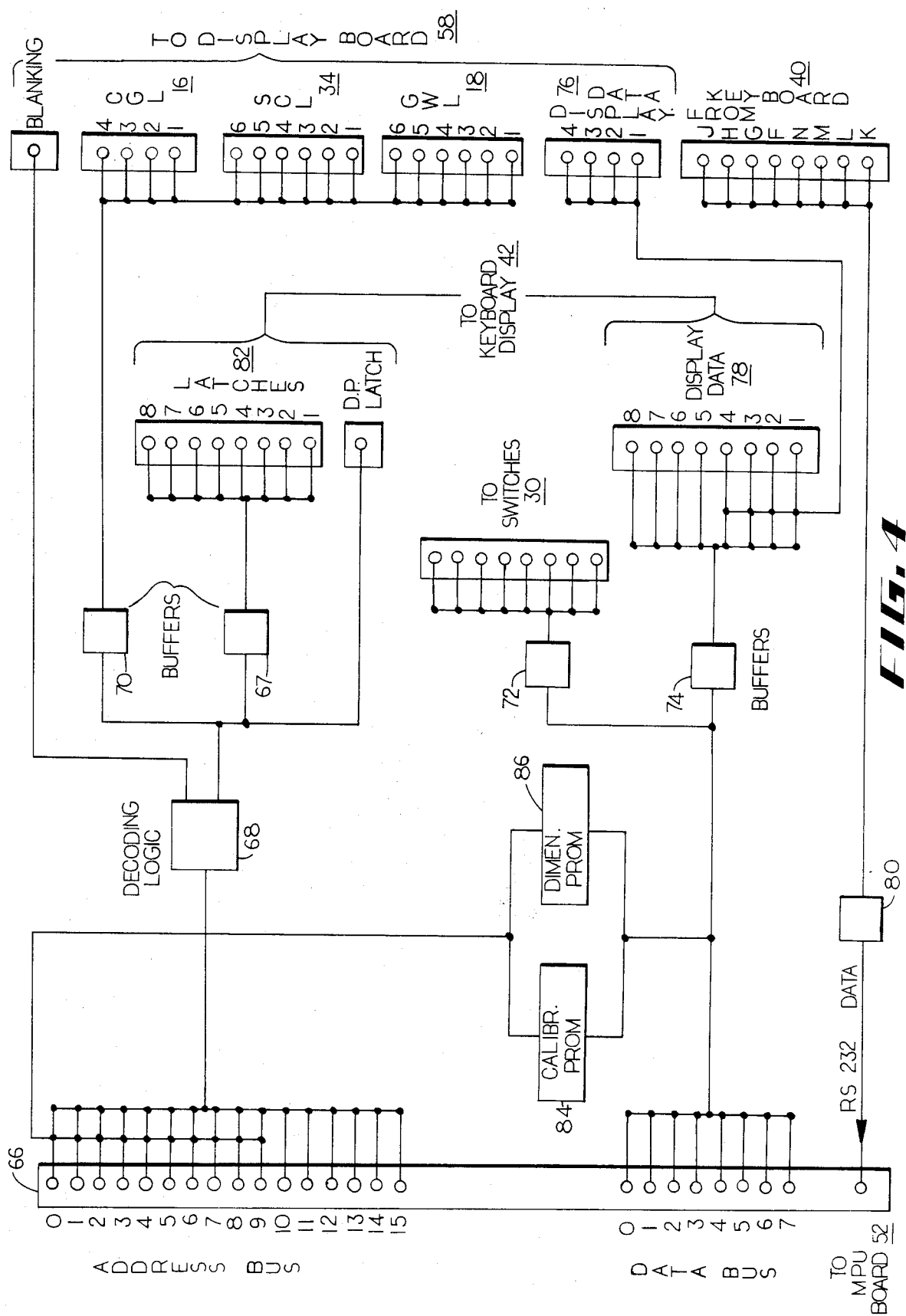
FIG. 4 is a simplified schematic diagram showing one section of the control board of the invention.

FIG. 4 is a simplified block diagram of control board 54 in FIG. 3. This board has two functions. It provides an interface between the keyboard board 60, the display board 58 and the microprocessor of board 52, all shown in FIG. 3. It also contains the EPROMs which store the object dimensions and load cell constants necessary to perform the weighing. An edge connector 66 plugs into the mother board 44 in FIG. 3, having access to the microprocessor signals. The memory address provided by the microprocessor during program execution is decoded by the decoding logic in block 68. As shown the upper portion of the edge connector 66 contains the address bus having 16 bit lines. All 16 bit lines are fed into conventional decoding logic in block 68 and through buffers 67 and 70 to the various outputs of this board. The outputs feeding through the display board buffers 70 include the four lines to the center of gravity display 16, the six lines to the selected load cell display 34, and the six lines to the gross weight display 18. The keyboard display buffers 67 hold the decoded output to the 8 keyboard latch outputs 82. The lower portion of the edge connector 66 contains the data bus lines 0–7. Gating of the data on the data bus lines is controlled by the load cell selector switches 30 via the multiplexers and coding logic shown as block 72. Data from the data bus which is to be displayed on the keyboard display LCD 42 is output over the 8 display data lines 78 via the display data buffers in block 74. This particular embodiment also includes preset PROMs (programable read only memory) containing the calibration constants for a known set of load cells and the dimensions characteristic of particular known aircraft. These PROMS are shown as blocks 84 and 86 respectively; standard part TMS 2708 is used for both PROMs in this embodiment. The display data which appears on either the center of gravity display, the selected load cell display, or the gross weight display is output over the four display data lines 76 which feed the display board 58. The final functional element shown on this figure is the output from the keyboard 40 which passes through a driver element 80 which converts the keyboard output to standard RS232 serial data output which is conducted to the MPU board 52 via the indicated line on the edge connector 66. The keyboard used in this embodiment is a standard Grayhill model 86BA2. Also found on the control board but not shown for reasons of simplicity are an oscillator which provides a phase input to the system, various power inputs and outputs, a clock line from the microprocessor which controls the form of the RS232 serial data output, and the multiplexing logic for the backlights behind the load cell selector switches 30. These unillustrated portions are straightforward applications and are well within the skill of a routine practitioner in this art.

Figure 5:
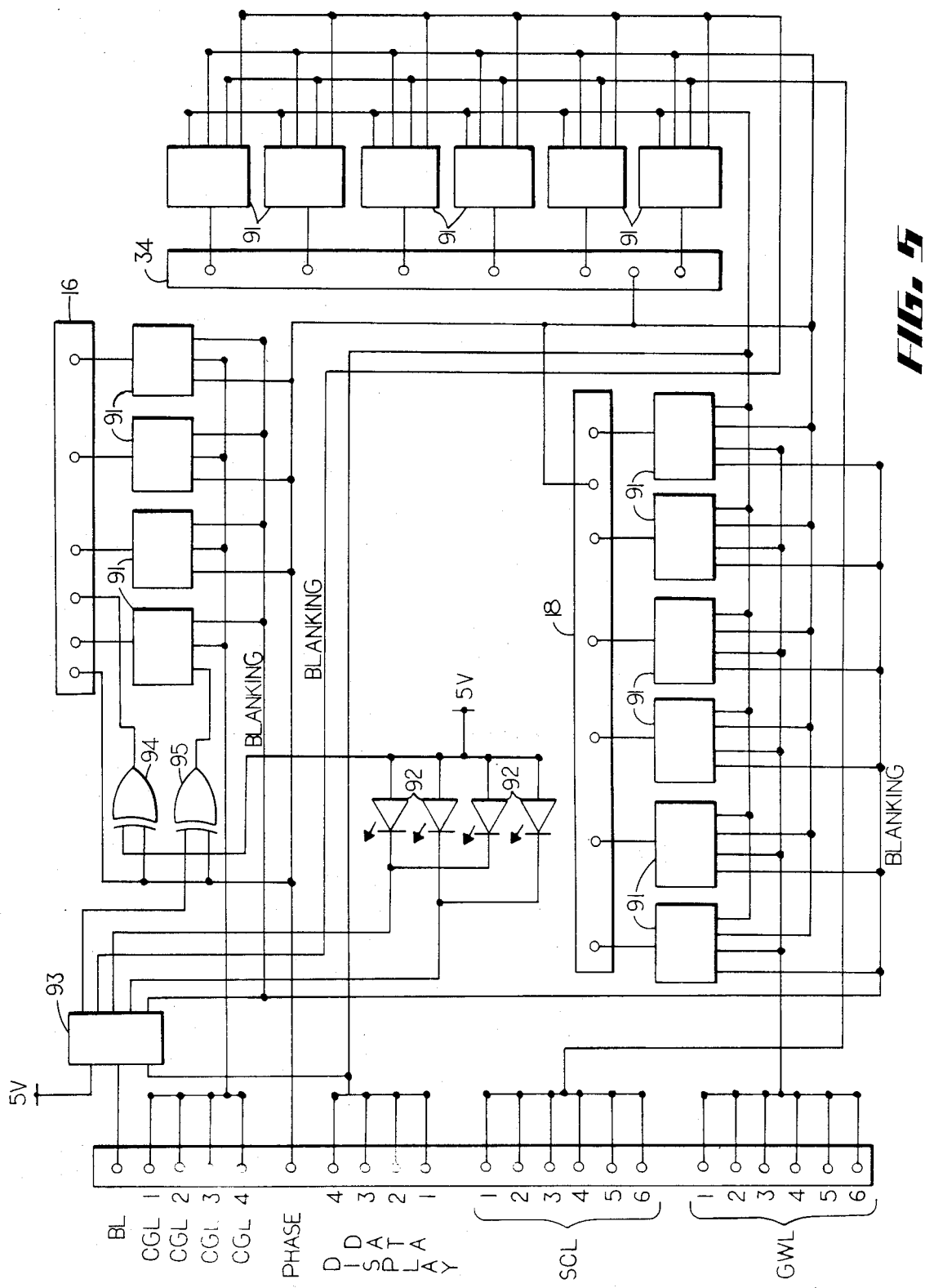
FIG. 5 is a simplified schematic diagram of the display board of the invention.

FIG. 5 is a block diagram of the layout of the display board. The inputs to the display board are shown on the left edge of this figure and originate as the outputs from the control board shown in FIG. 4. This board operates the three displays, the center of gravity display 16, the gross display 18, and the selected load cell display 34. These three displays and this embodiment are standard parts IEE5657, IEE5663, and IEE5663 respectively, all being straightforward multiple digit seven segment display elements. The various seven segment digits on each display are driven by the various driver elements 91 which are all standard part 4543 BCD to seven segment display drivers. The center of gravity display 16 has added circuitry to control the function of a + or − sign since this quantity, center of gravity, may be negative as handled by this particular weighing system. Since the center of gravity display may be a negative quantity, the most significant digit in this display may be a negative sign. Because this is not a standard binary character which is supported by the driver elements 91, a minus sign is created by displaying a zero and inverting the phase input to the particular driver. In seven segment display code, an inverse zero will appear as a minus sign. This logic is handled by logic gate 95 connected as shown. Also the center of gravity has an illuminated decimal point. This particular display element is driven by logic element 94 in a manner similar to the minus sign discussed above. The four light emitting diodes 92 driven by the quad latch 93 (standard part number 74LS175) are selectively energized to illuminate the units of weight indicators 28 and 36 shown in FIG. 2. Each of the driving elements 91 has several inputs. The actual digit which appears on each display element will be taken from the display data lines. The enablement of a particular driver element 91 will be controlled by an individual enable line, here one of the four CGL lines, one of the six SCL lines, or one of the six GWL lines. Since the LCD displays require an AC drive voltage, this power input will be conveyed to each driver element 91 via the phase line as shown. Also shown in this figure are the various blanking lines to the individual display output from the quad latch 93 responsive to the BL input on the left edge of the figure. Not shown in this figure but present on this board are the electroluminescent display backgrounds which require in this embodiment 115 volts AC. These serve as backlights behind the liquid crystal displays so that the displays can be viewed in the dark.

Figure 6:
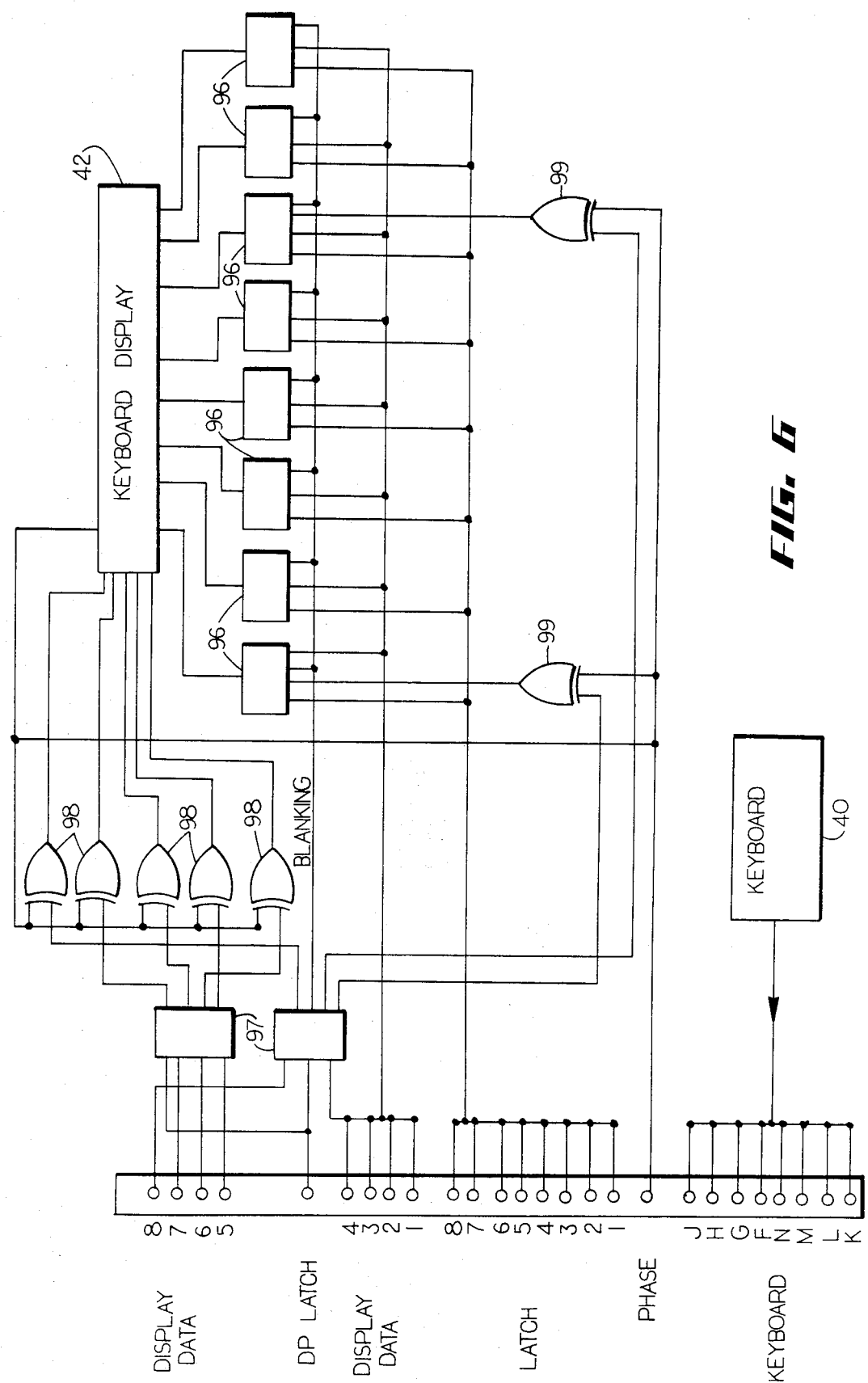
FIG. 6 is a simplified schematic diagram of the keyboard controller board of the invention.
Figure 7A:
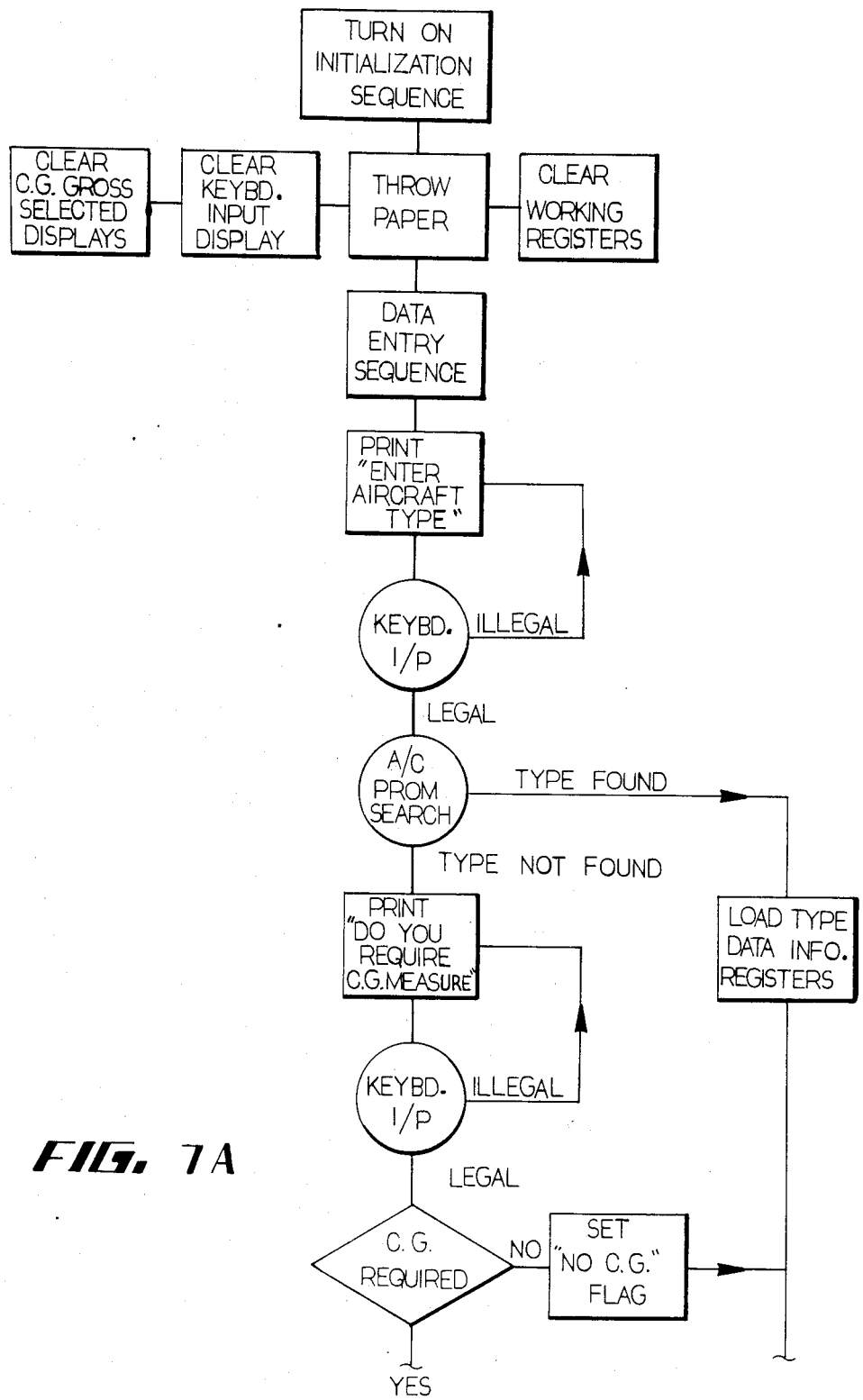
Figure 7B:
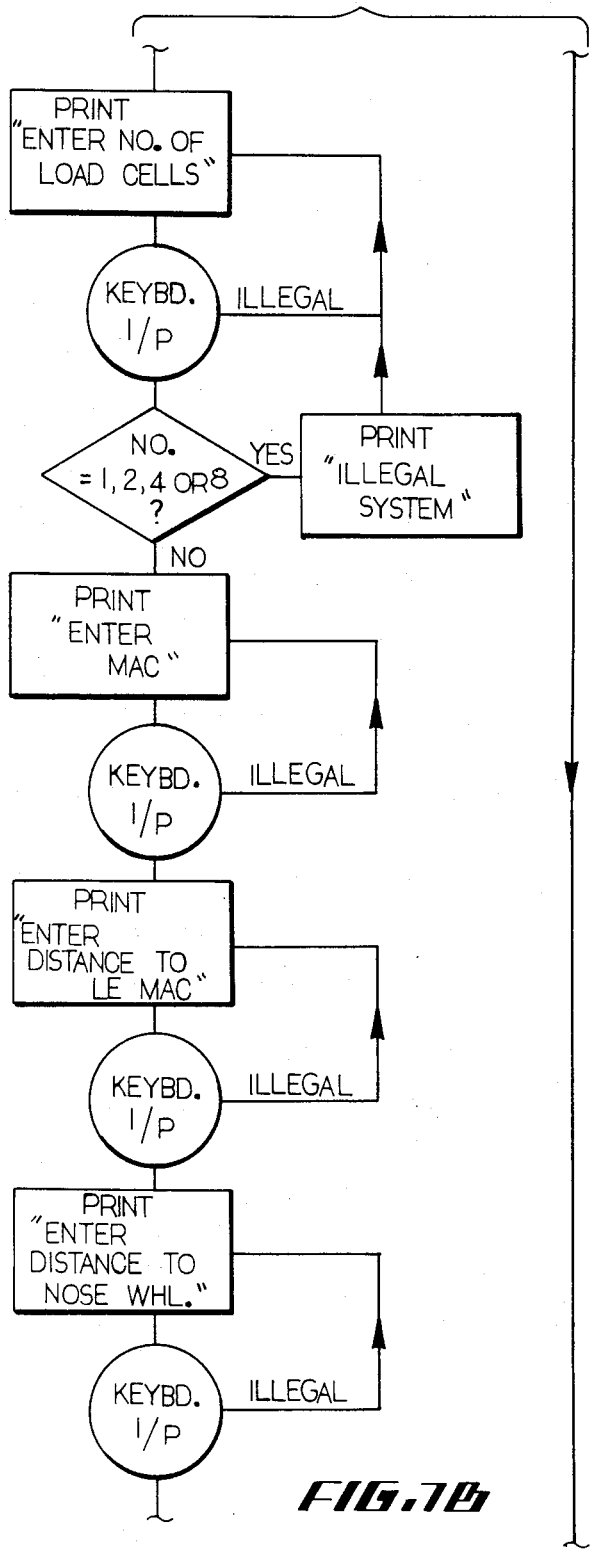
Figure 7G:
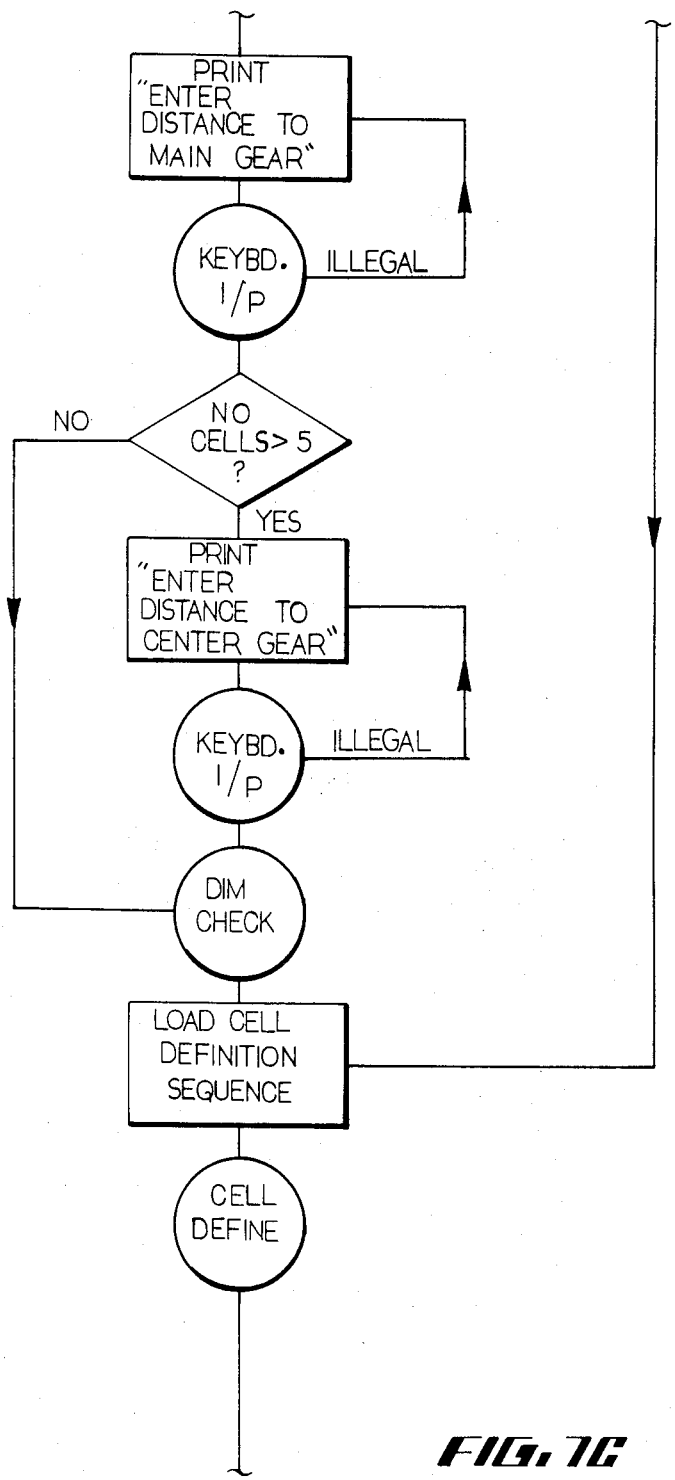
Figure 70:
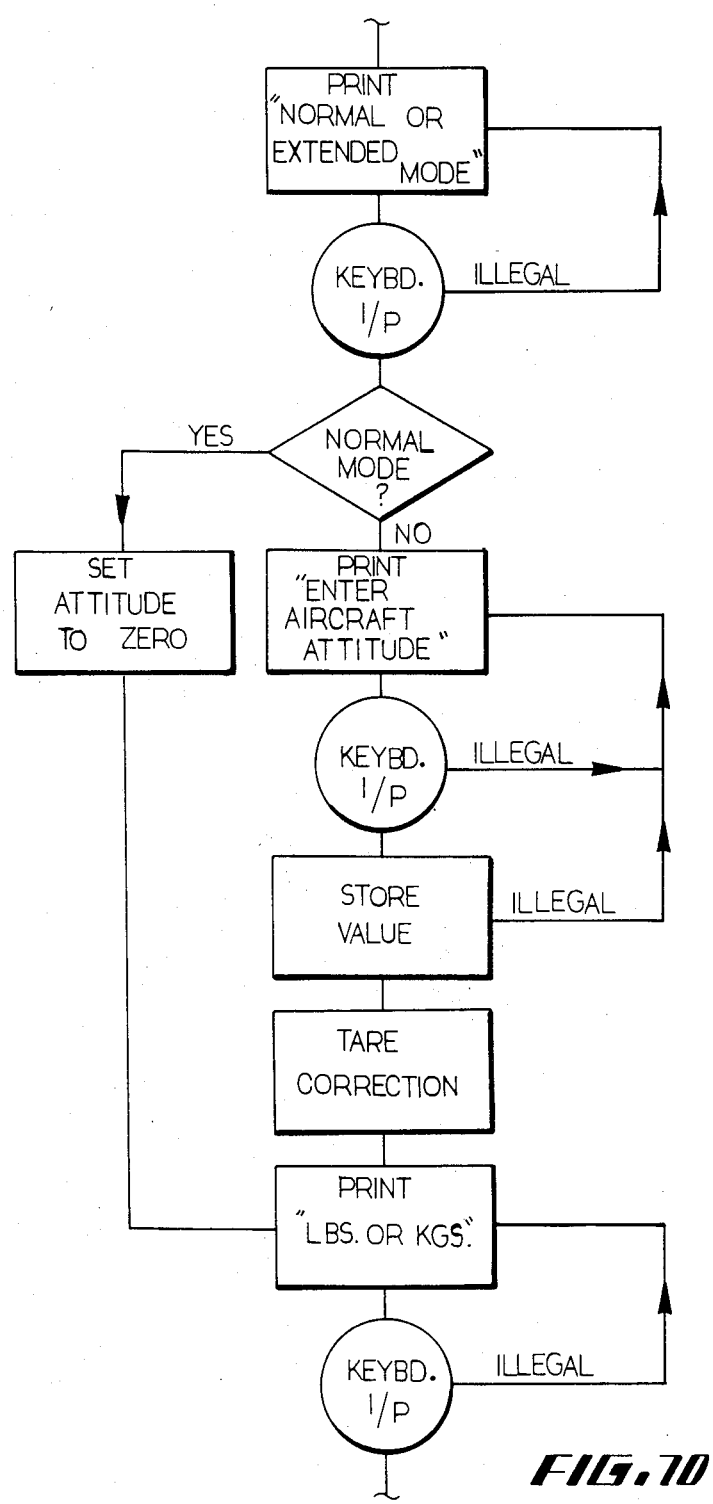
Figure 7E:
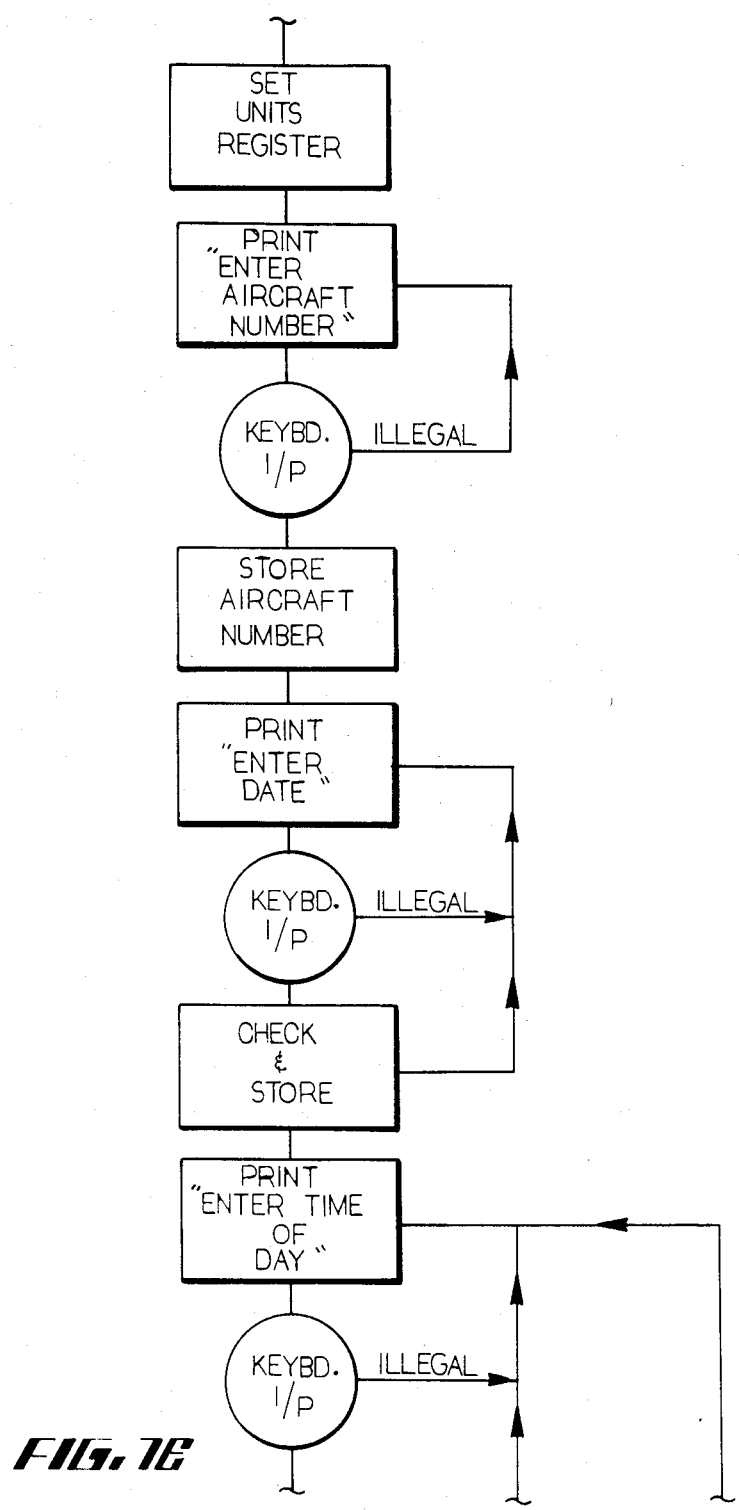
Figure 7F:
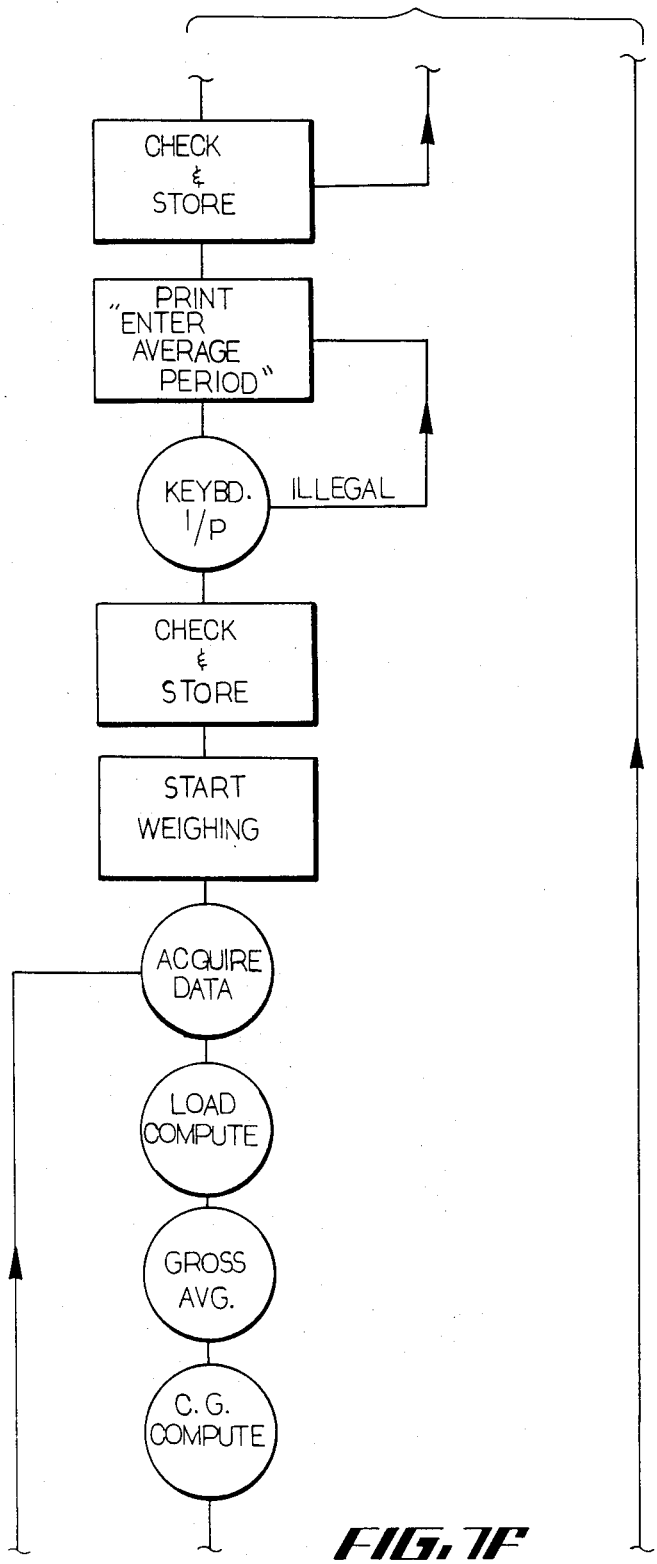
Figure 7G:
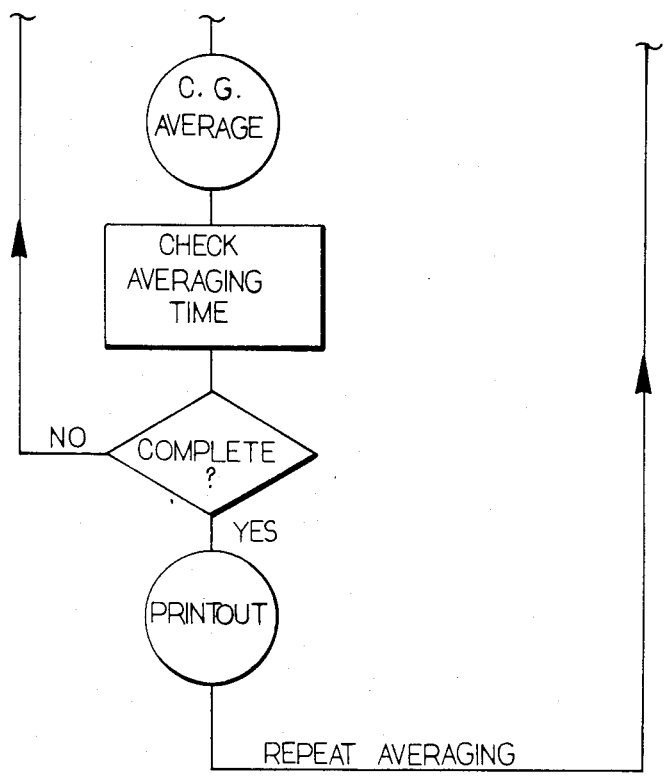

FIG. 6 is a simplified block diagram of the keyboard board of this system. As in the previous figure, this board has as its input the outputs as shown from the control board on FIG. 4. The keyboard board houses both the keyboard display and its drivers as well as the actual keyboard itself 40. The keyboard display in this embodiment is an eight digit LCD display driven by the various drivers 96. These drivers function in the same manner as the corresponding drivers 91 in FIG. 5 and are the same standard part. The activation of an individual digit in the display is controlled by one of the eight latch lines serving as an individual input to the various display drivers 96. The data displayed over an individual display element is input from the various display data lines as shown. Blocks labelled 97 are quad latches as in FIG. 5 and are the same standard part. These latches in FIG. 6 drive the logic elements 98 and 99. The elements labelled 98 control the activation of the various decimal points in the display in cooperation with the DP latch input. The logic element 99 control the operation of the minus signs (−) in the display as has been discussed previously in conjuction with FIG. 5. The keyboard used by the operator to input data is shown as block 40 which transfers the data to the rest of the system via the lines labelled keyboard J, H, G, F, N, M, L and K.

Figure 8A:
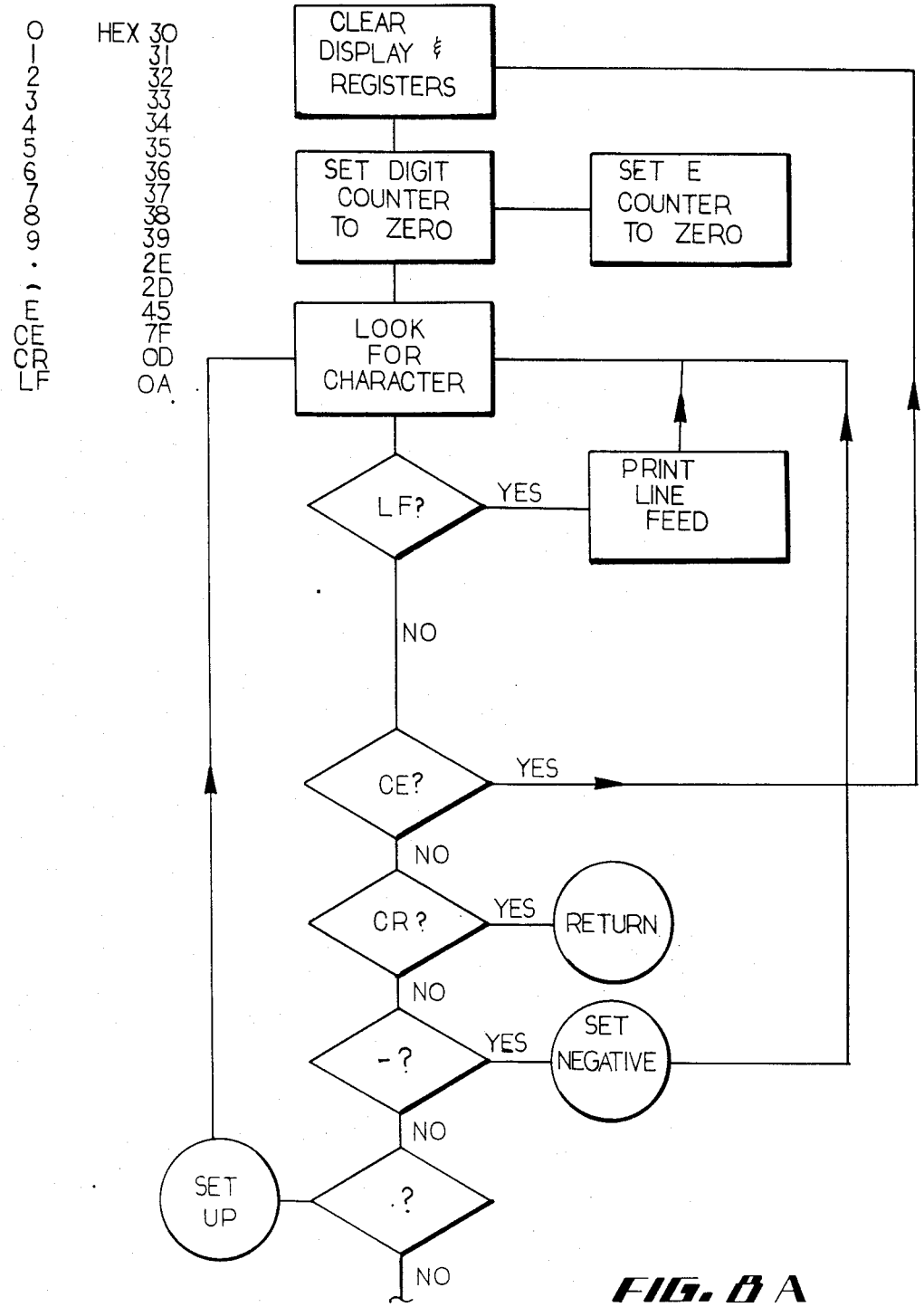
Figure 8B:
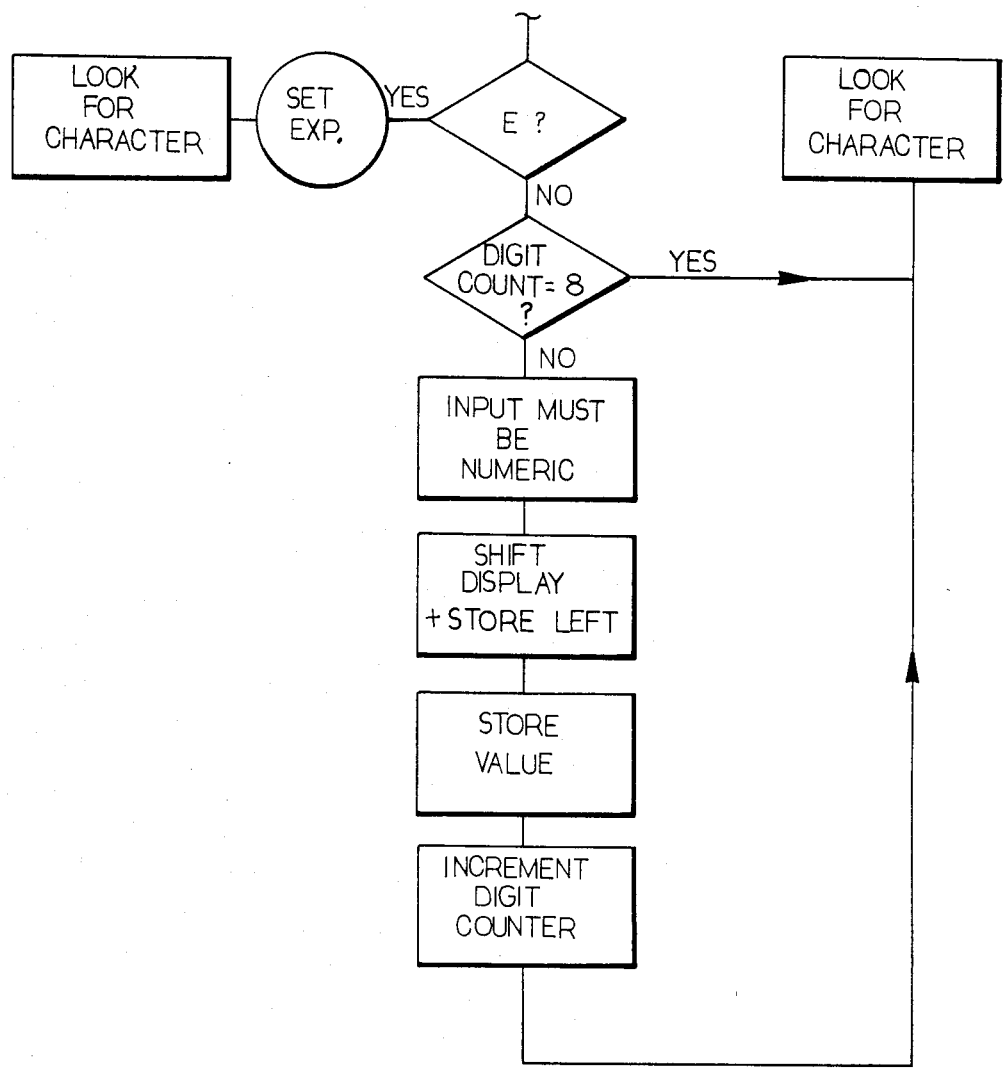
Figure 9:
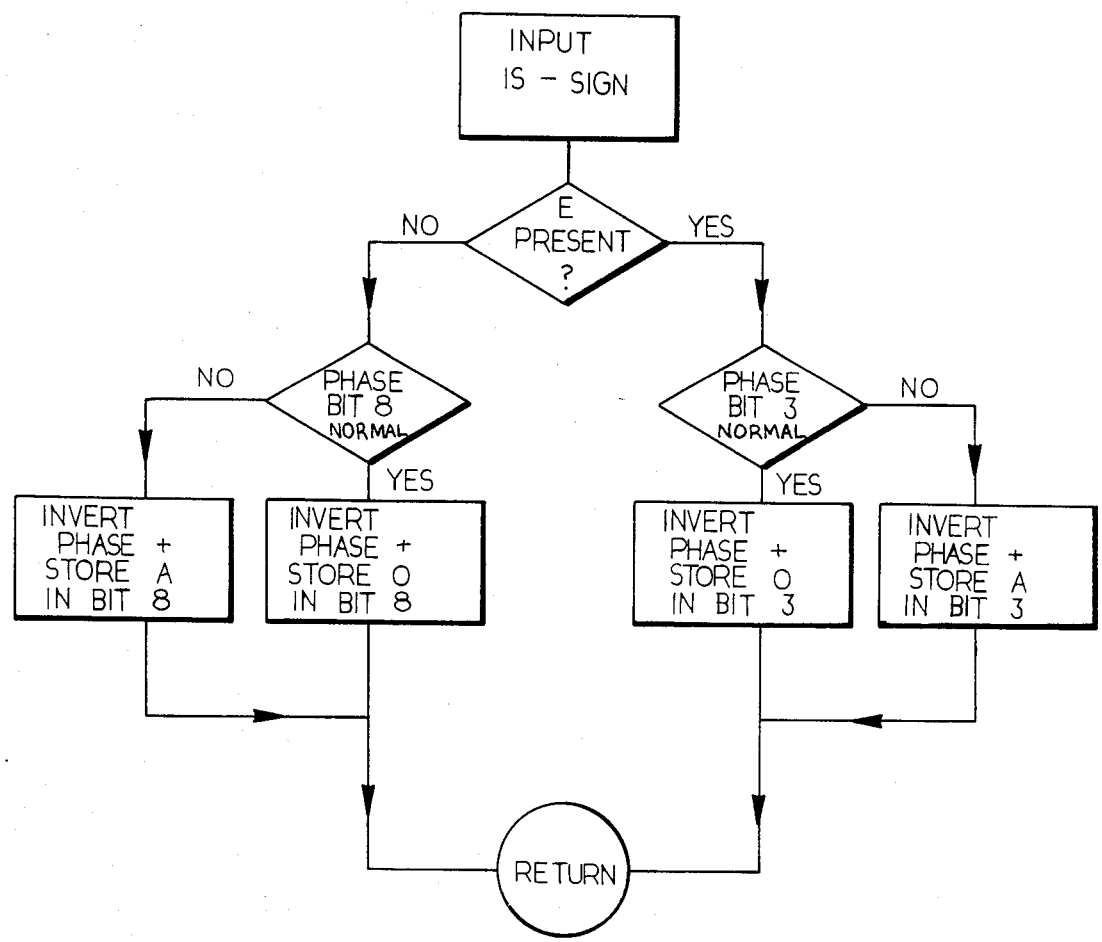
Figure 10:
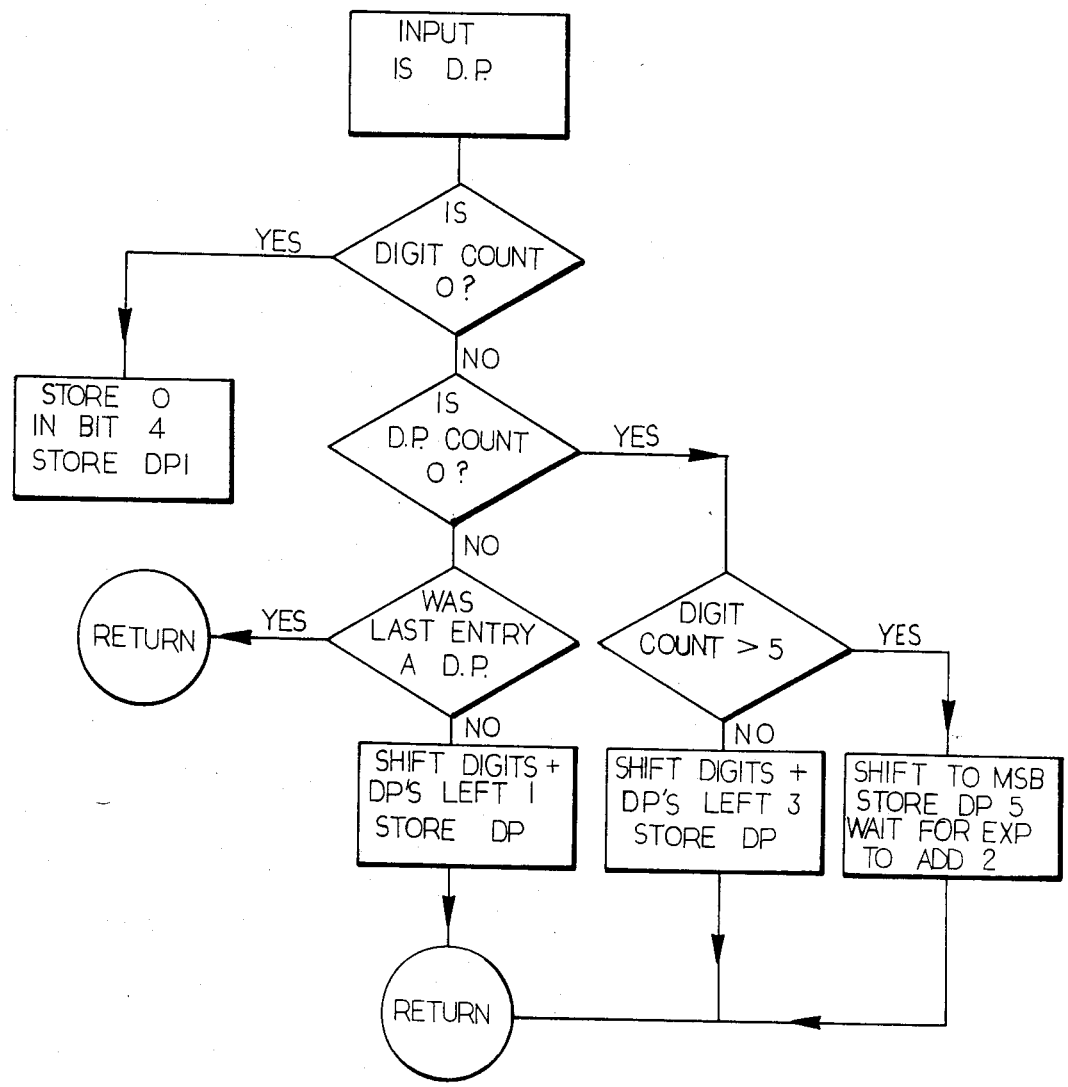
Figure 11:
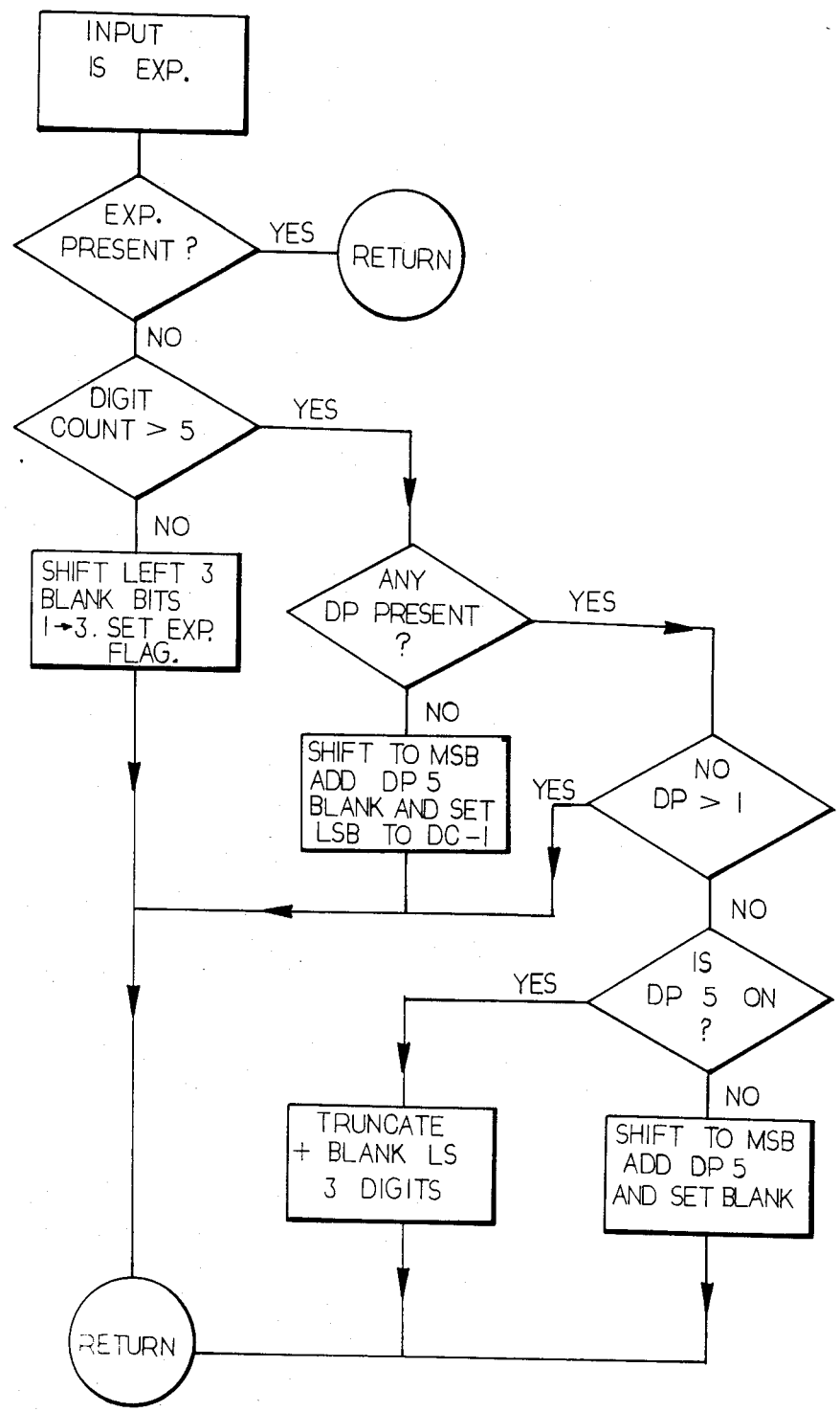
Figure 12:
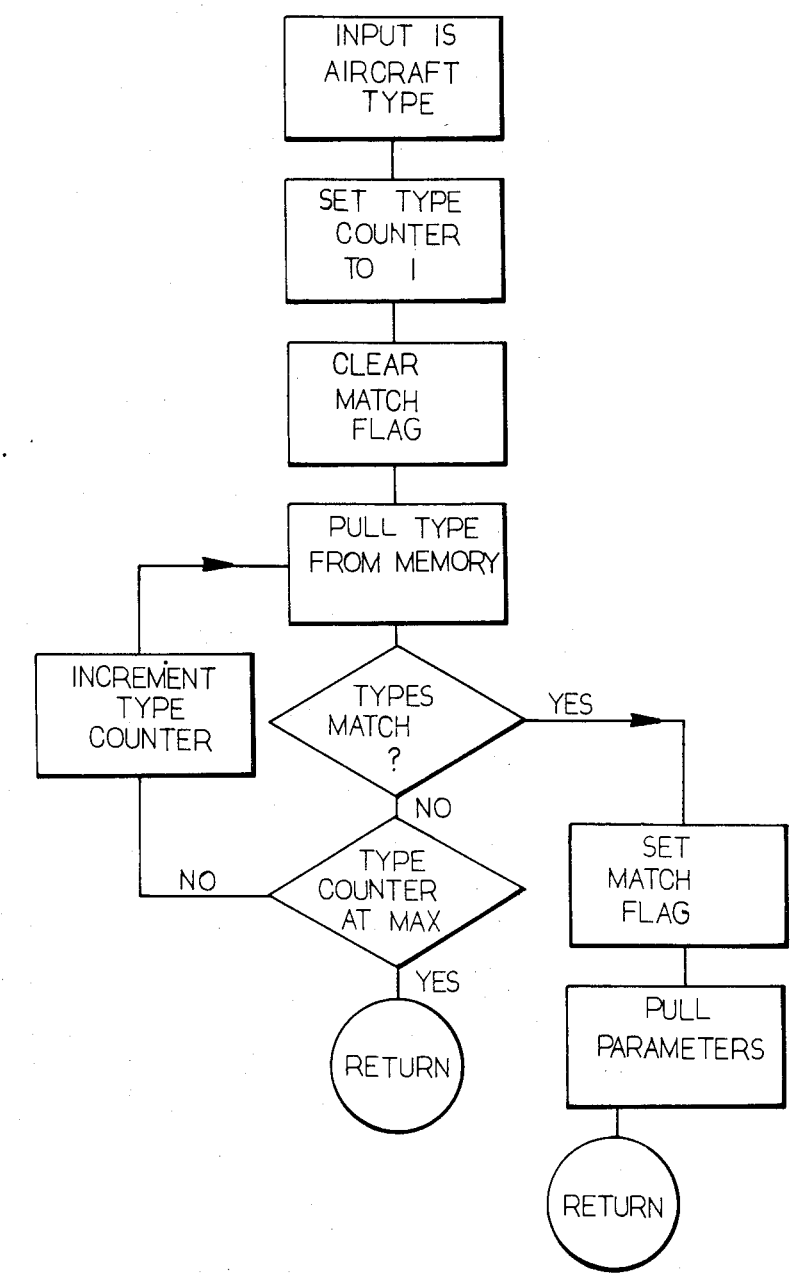
Figure 14:
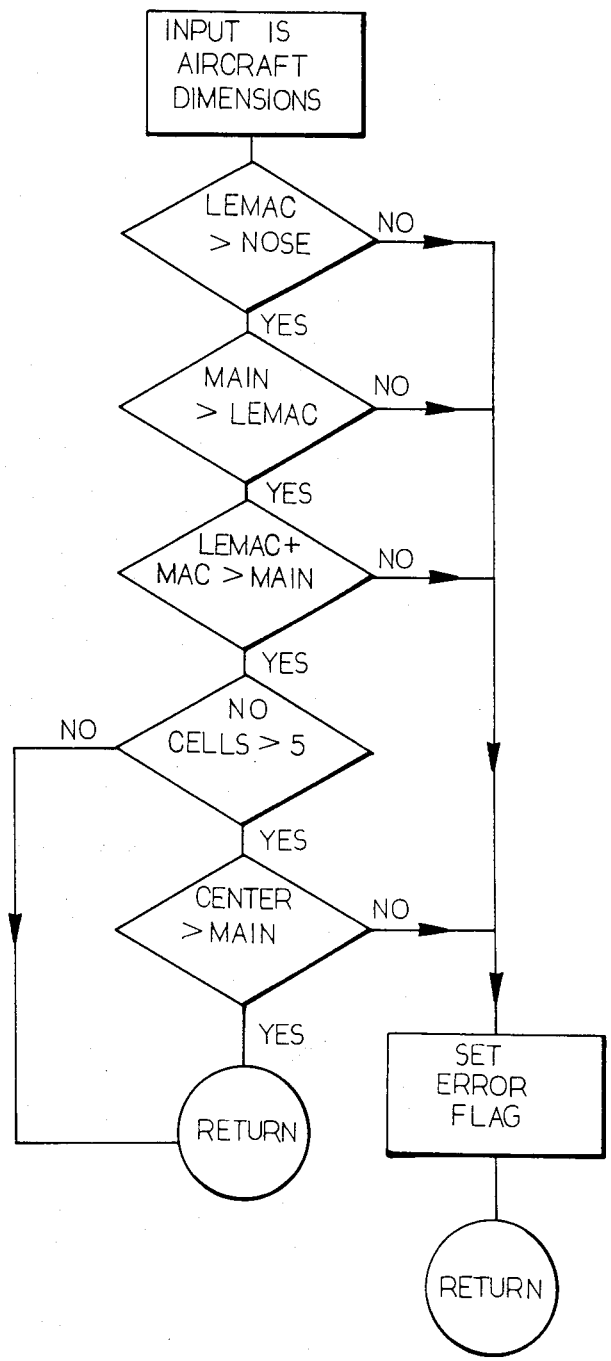
Figure 14A:
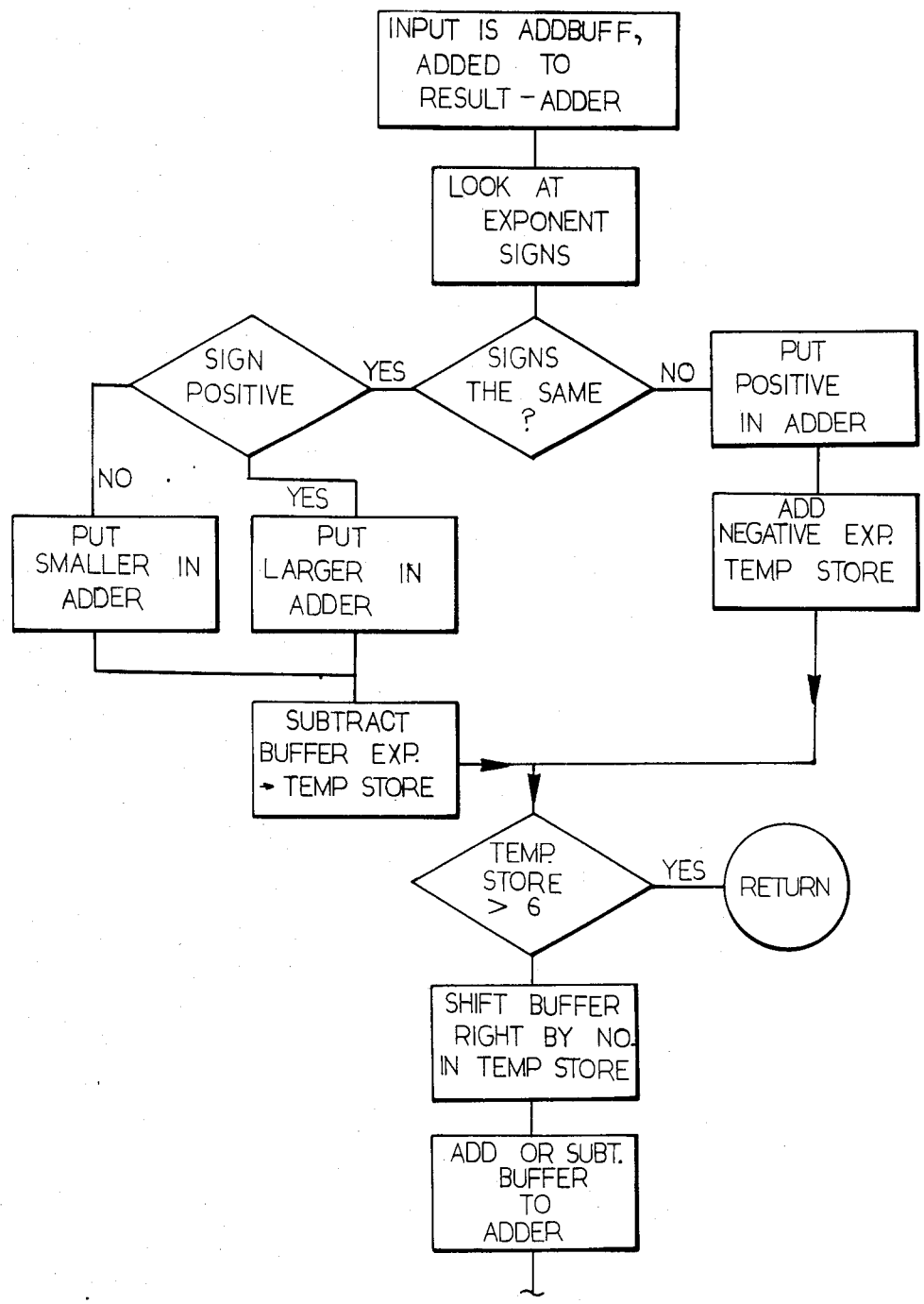
Figure 14B:
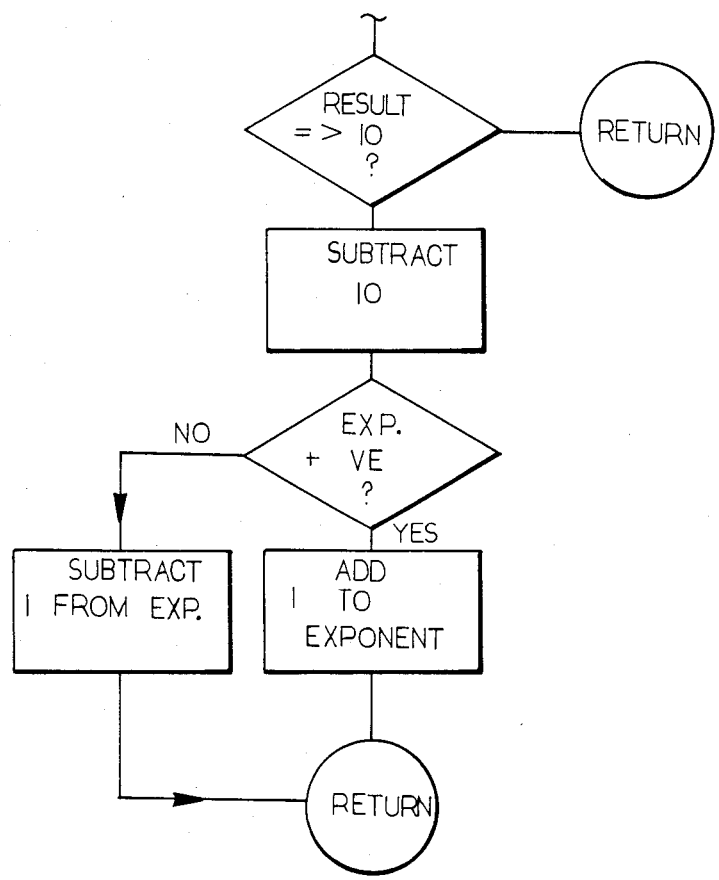
Figure 15A:
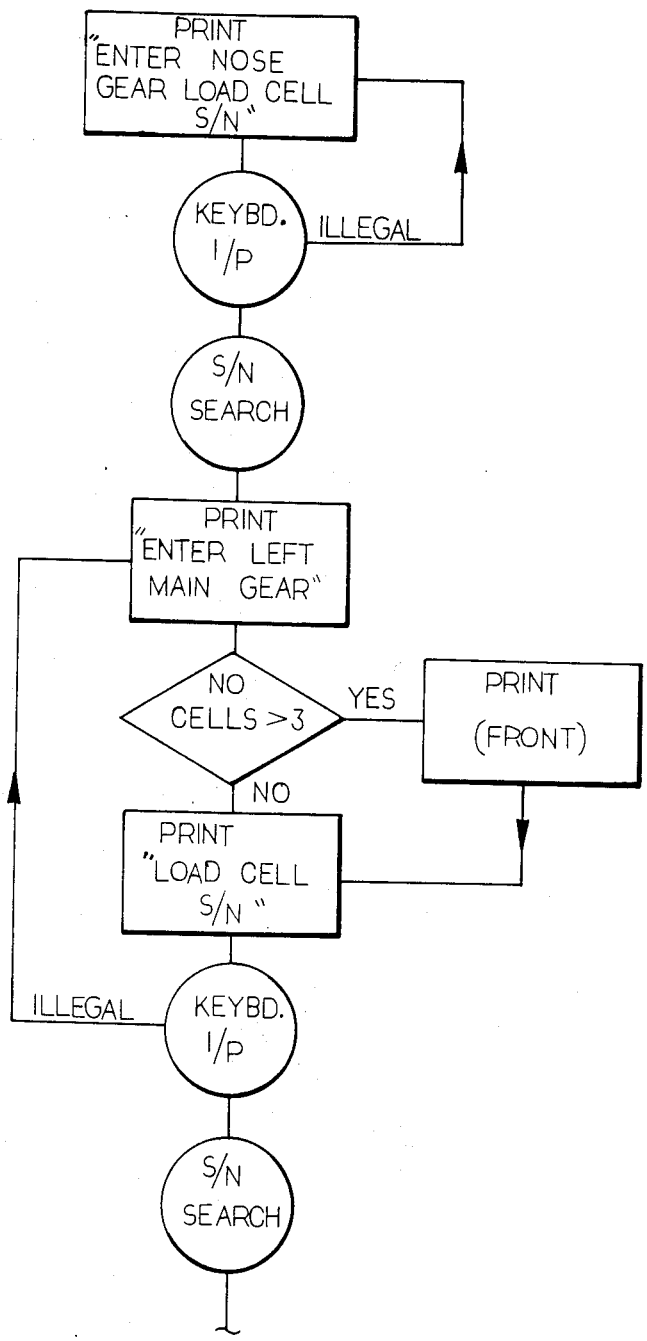
Figure 15G:
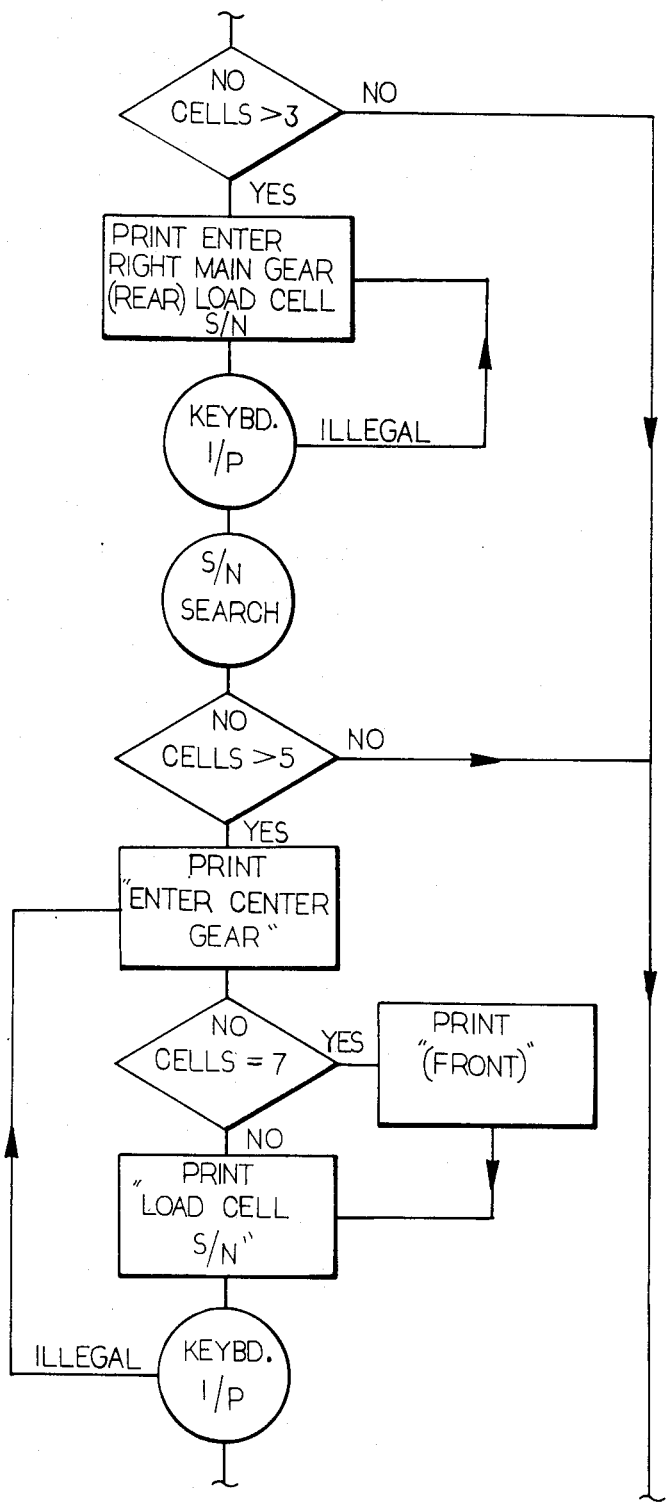
Figure 15D:
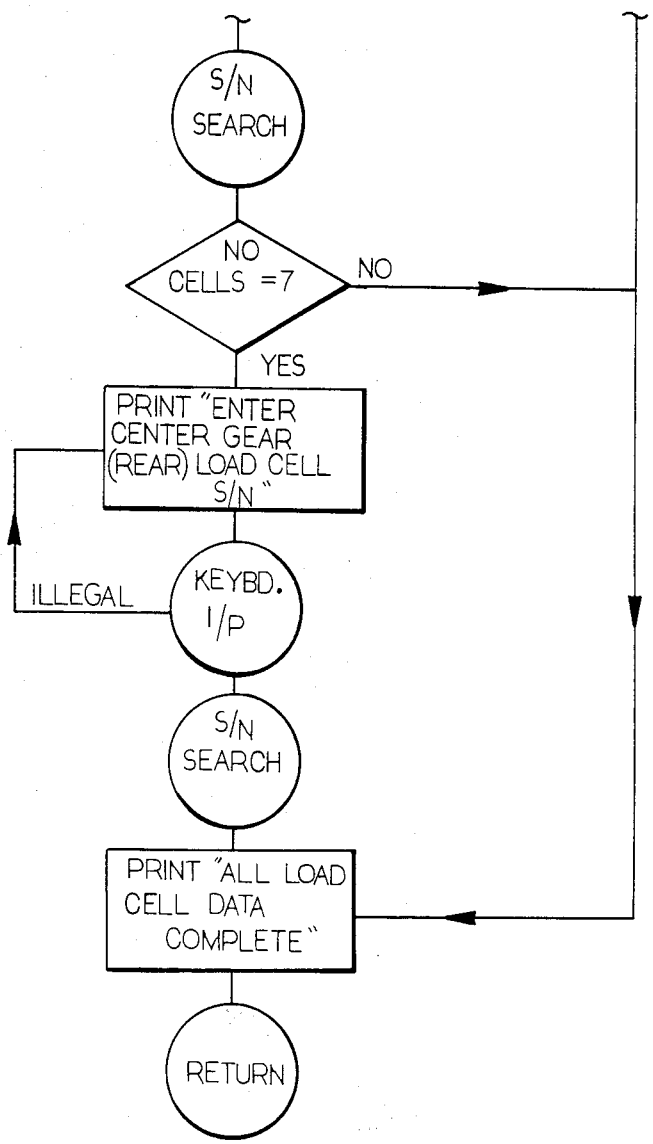
Figure 16:
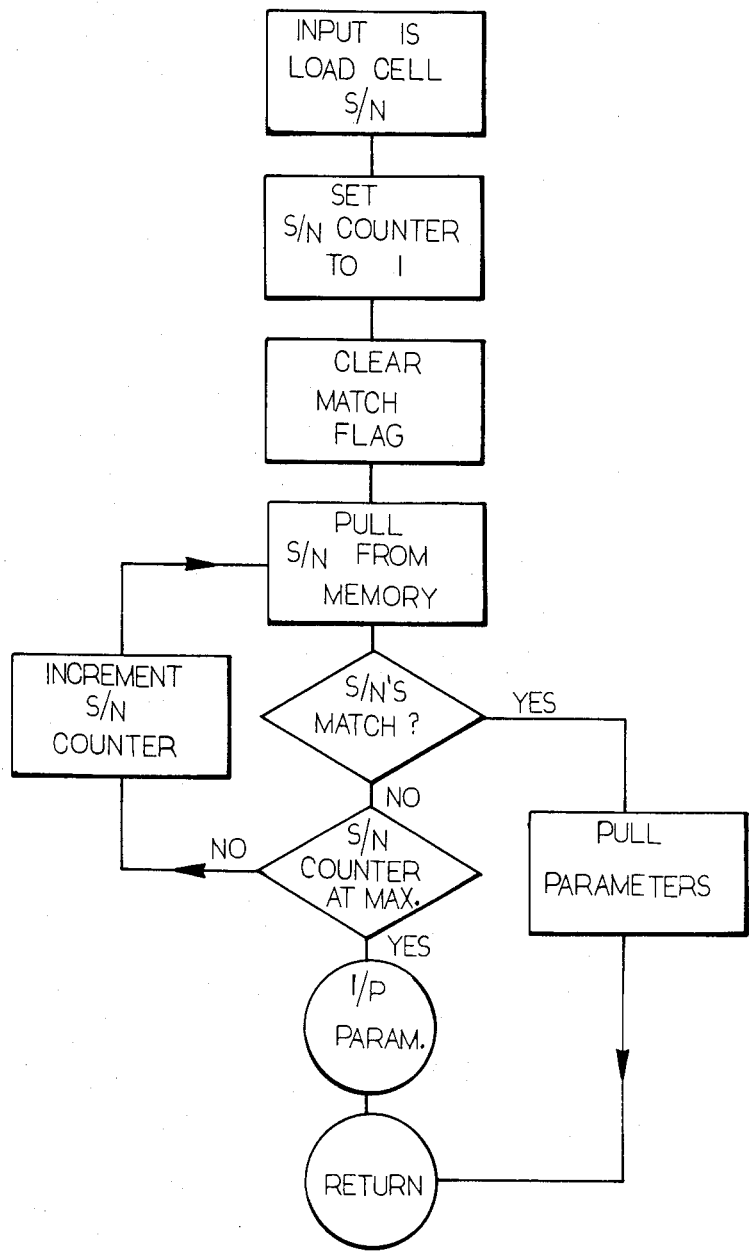
Figure 17:
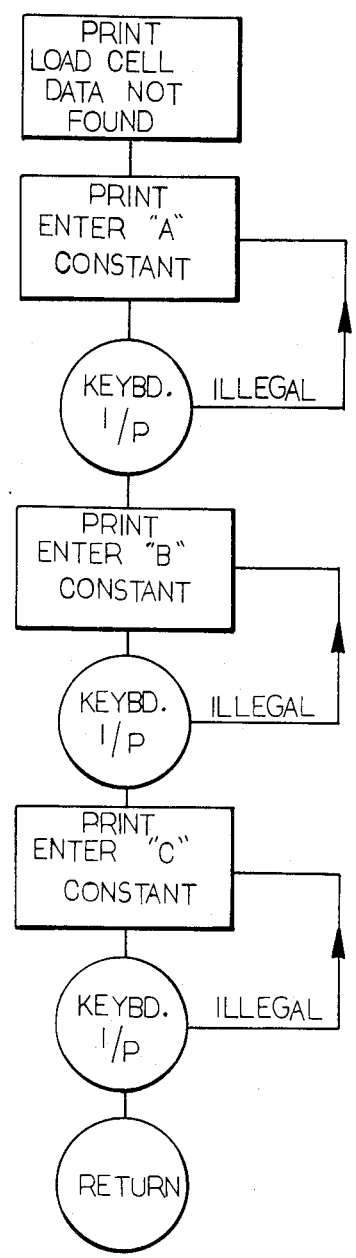
Figure 18:
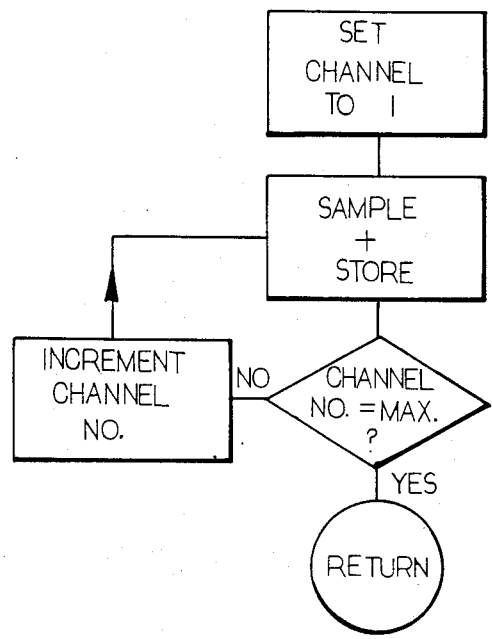
Figure 19A:
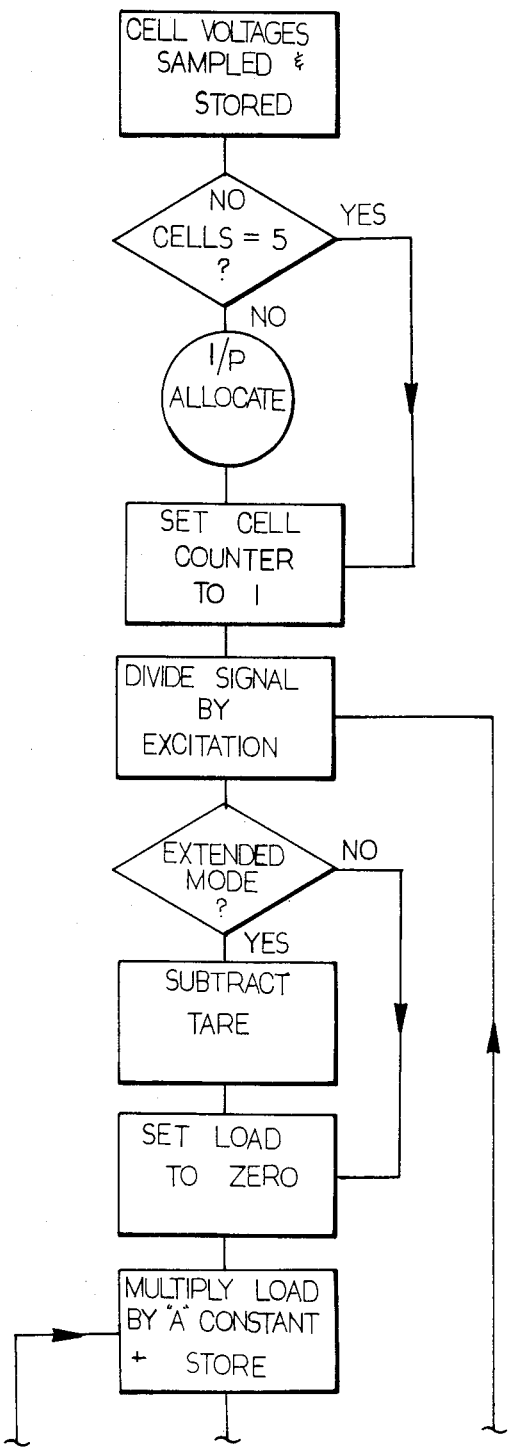
Figure 19B:
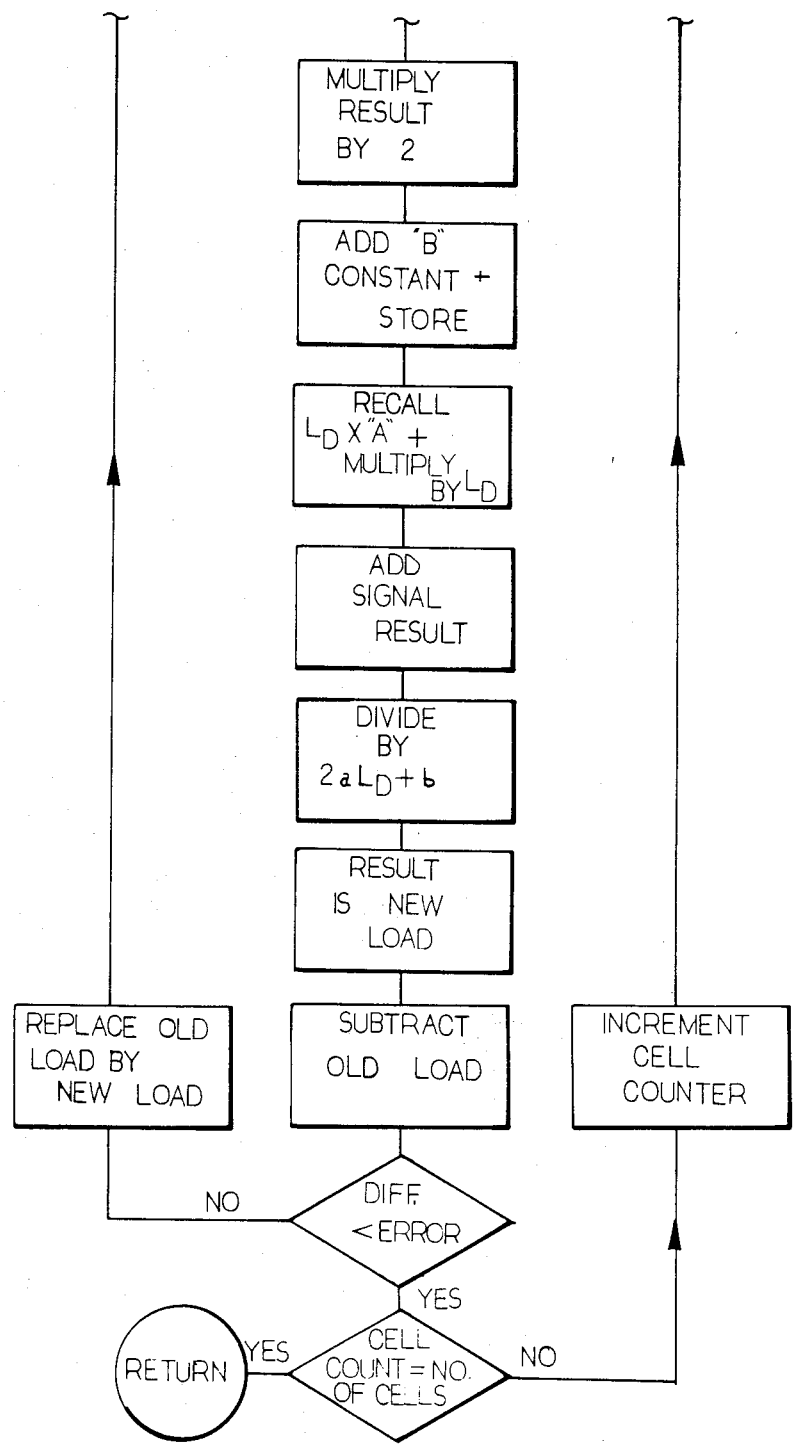
Figure 20:
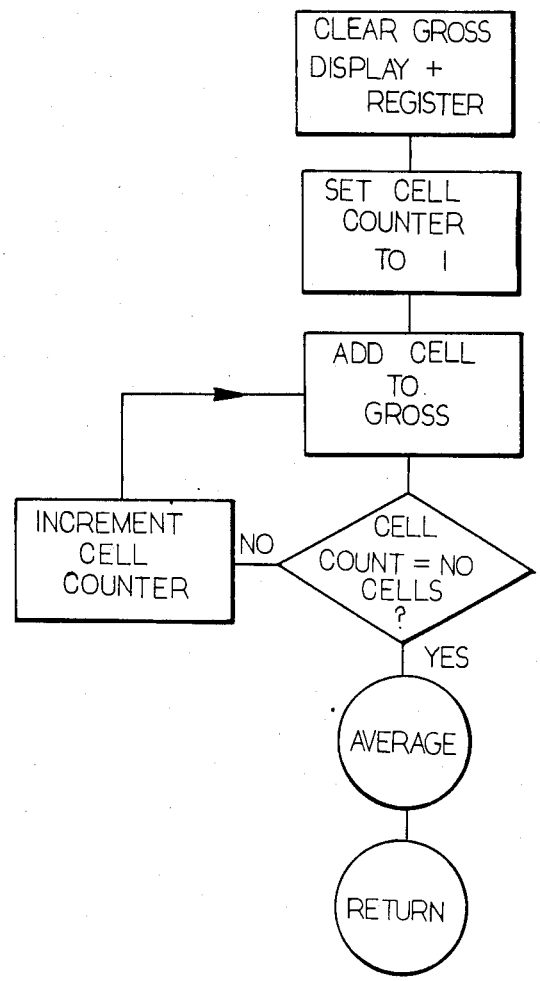
Figure 21:
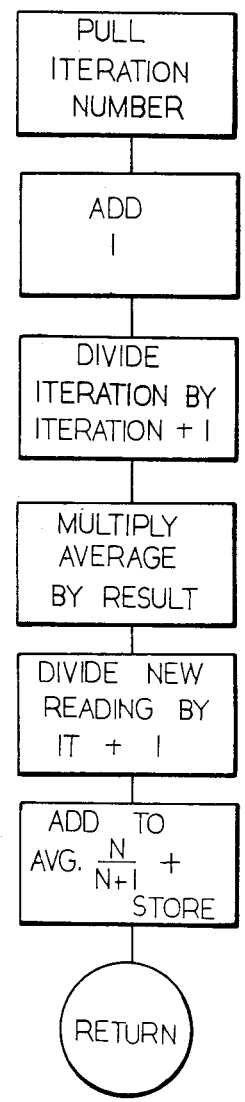
Figure 22A:
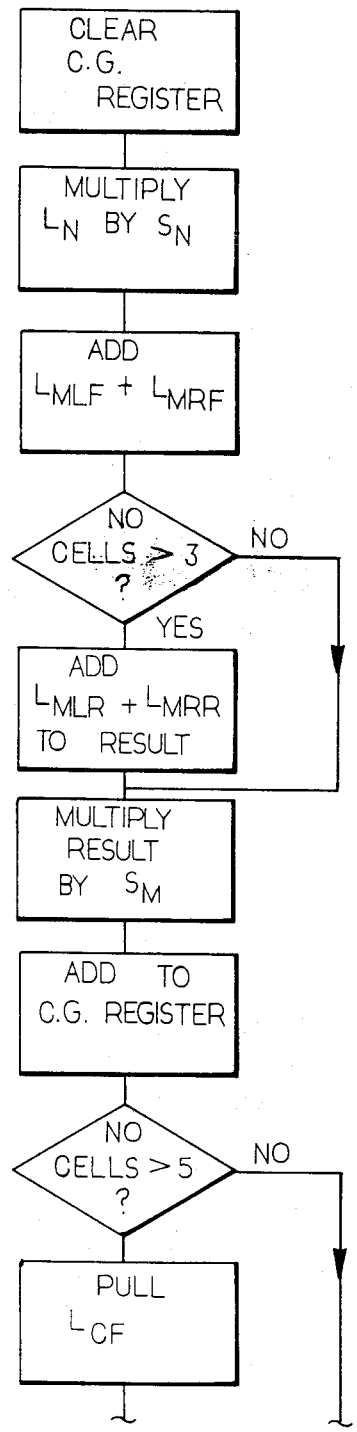
Figure 22:
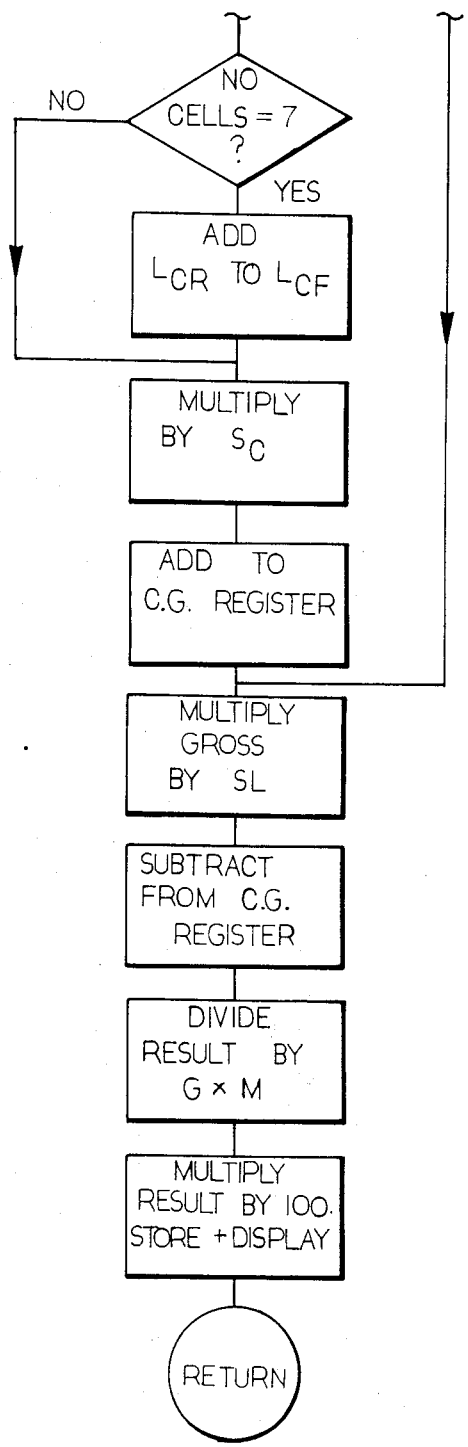

FIGS. 7 to 24 illustrate a flow chart of a program written in Motorola MC 6800 Assembly Language which resides in the system. This program provides instructions to the microprocessor and consists of 24K bytes of instruction code. FIGS. 7A to 7G show the main program for weighing an object, which in this particular application is an aircraft. FIGS. 8A and 8B show a subroutine to handle the keyboard operations of keyboard 40. FIG. 9 shows a subroutine to handle negative numbers present on input and computation data. FIG. 10 shows a subroutine to set decimal points in data for printout, display or system temporary storage. FIG. 11 shows a subroutine to handle exponential numbers present on input or computation data. FIG. 12 shows a subroutine to search the EPROM for an aircraft type that matches the entered aircraft type. FIG. 13 shows a subroutine to verify the validity of the aircraft dimensions input data. FIGS. 14A and 14B show a subroutine to add at least two numbers for displaying or computation purposes. FIGS. 15A to 15D show a subroutine to request the keying of cell serial numbers. FIG. 16 shows a subroutine to match a cell serial number stored in EPROM with a keyed serial number and to retrieve the corresponding cell constants. FIG. 17 shows a subroutine to request the keying of cell constants when its serial number is not in EPROM. FIG. 18 shows a subroutine to acquire the output ratio data of each cell and store it in RAM. FIGS. 19A and 19B show a subroutine to calculate the load of each cell used in the system. FIG. 20 shows a subroutine to calculate the gross weight of a single weighing and the average gross weight of all weighings. FIG. 21 shows a subroutine to determine average values of any numbers. FIGS. 22A and 22B show a subroutine to calculate the center of gravity for a single weighing. FIG. 23 shows a subroutine to calculate the average center of gravity for all weighings. FIGS. 24A and 24B show a subroutine to handle the printouts on printer 26.

The theory of operation of this system is explained hereinafter. A load cell is an enclosed iron slug to which a strain gauge bridge is bonded. Compression of the slug causes a physical change in the strain gauge dimensions which in turn causes a change in gauge resistance. By exciting the gauge with a known voltage, the gauge resistance change may be determined by measuring the gauge voltage output. Typically, a gauge voltage output at full load is 2 millivolts per volt of excitation voltage. The system amplifies the gauge voltage and converts both excitation and gauge voltage to 12-bit binary numbers. A voltage conversion is further accomplished by knowing the voltage per bit in the binary number. The gauge voltage is divided by the excitation voltage to give the output ratio, in millivolts per volt. The calibration of a cell is performed by measuring the output ratio of known loads. The equation to determine the total load is the following:

$$\text{Output ratio} = A \times \text{load}^2 + B \times \text{load} + C \quad (1)$$

where A, B, and C are constants.

The "A" constant relates to the nonlinearity of the cell. The "B" constant is the linear coefficient and the "C" constant is the zero offset coefficient. These three constants are stored in the weighing system under the cell serial number. When this serial number entered by the operator matches a serial number stored in the system memory, the A, B and C constants are retrieved. Then, the load on the cell is easily calculated as follows:

$$\text{Load} = -\frac{B + \sqrt{B^2 - 4A(C - \text{output ratio})}}{2A} \quad (2)$$

However, if the "A" coefficient is very small, rounding errors will introduce large inaccuracies into the load calculations. In such cases a Newton-Raphson interative technique is used in which load equation (2) can be represented as follows:

$$\text{Load}_{N+1} = \frac{A \times \text{Load}_N + (\text{output ratio} - C)}{2 \times A \times \text{Load}_N + B} \quad (3)$$

Rearranging equation (3) and setting $A = 0$, then $$\text{Output ratio} = B \times \text{Load} + C. \quad (4)$$

Equation (4) is equal to equation (1) if the cell has zero nonlinearity ($A = 0$). Since the nonlinearity term is small, very few iterations are required to achieve an accurate load result.

Once the load is determined, the object's gross weight is calculated by summing all the cell loads. The object gross weight is used to compute the object center of gravity by simply taking moments about a reference point.

The operation of the object weighing system is characterized by a conversational interaction between the operator and the system. The operator initiates this interaction followed by a response from the system. This response may be either a question or a statement printed out on a strip of paper tape. This conversation continues in accordance with a preprogrammed format until the weight of the object is finally determined. Thereafter, the system issues a printed summary of all pertinent information.

In preparation for weighing, the load cells are placed in position, and each cell serial number is recorded. Then, the object is placed atop the load cells, and the following weighing procedure starts:

(a) Turn power on by depressing power switch 38, which illuminates. Response from the system appears in printer 26 as "ENTER OBJECT IDENTIFICATION."

(b) Key-in object identification. In the case of a system used for aircraft weighing, key-in aircraft type, including model and series. Use a decimal point to separate the model number from the series number. These numbers may consist of the following:
DC10; Series 10, 30, 40
DC9; Series 10, 20, 30, 40, 50, 80
DC8; Series 50, 54, 61, 62, 63, 71, 72, 74

The system response is "KNOWN TYPE—CG DATA STORED."

(c) Next, the system requests the serial number for one specific load cell. In the case of a system used for aircraft weighing, the system requests "ENTER NOSE GEAR LOAD CELL S/N." The operator complies with this request by keying the appropriate serial number and depressing the key "ENTER" in keyboard 40.

(d) Then, the system requests the serial number of another load cell. Again, for an aircraft weighing, the instrument request is "ENTER LEFT MAIN GEAR LOAD CELL S/N." The operator complies to this request as in (c) above.

(e) All other requests for load cell serial numbers are complied to as in (c) above.

(f) After all serial numbers required are entered, the system response is "ALL LOAD CELL DATA COMPLETE."

(g) The system, next, requests "WEIGHING UNITS ENTER 0 FOR LBS. 1 FOR KGS." The operator selects the units desired by entering 0 or 1.

Then, for aircraft weighing, the system proceeds as in (h) and (i) below.

(h) The system request is "ENTER AIRCRAFT NUMBER." The operator enters an aircraft number in response to this request.

(i) Next, at the request of the system, the operator enters the flight number and current date, using decimal points to separate month, day and year.

(j) To start the weighing process, the time of the day is entered in hours and minutes, using a decimal point to separate the two entries.

When keying an unknown object identification in the system, the procedure differs as follows:

(a) In response to this unknown object, the system prints "UNKNOWN TYPE - NO CG DATA PRESENT IN MEMORY." Immediately afterwards, the system requests "DO YOU REQUIRE CG MEASUREMENT?"

(b) Following this, an interactive conversation takes place with the system. The operator keys-in information to the system necessary to calculate the center of gravity. This information is the number of load cells, and for aircraft weighing it includes the Mean Aerodynamic Chord (MAC), the distance to LEMAC, the distance to nose gear, the distance to main gear and the distance to the center gear, if more than five cells are required. All this data is entered in scientific notation, which scales a number by powers of ten. LEMAC stands for Leading Edge of Mean Aerodynamic Chord. The reference point from which all measurements are taken for a ground based CG measurement can be any suitable point in the airframe. To convert this to an aerodynamic measurement, the position of the MAC with respect to the reference point is necessary. The distance from the reference point to the MAC is known as the LEMAC.

(c) If the operator keys-in incorrect information, the system response is "ERROR." Then, an explanation of the error is printed. When this situation occurs, all data is reentered.

(d) Upon completion of the information provided by the operator, the system response is "CG DATA COMPLETE." Then, the serial numbers of all load cells are requested by the system and keyed-in by the operator. Finally, the system response is "ALL LOAD CELL DATA COMPLETE"; then the procedure continues in (g) above.

Sometimes, a load cell serial number is keyed-in for a cell whose calibration constants a, b and c are not stored in the system memory. In such a situation, the system requests that these constants be entered manually. Nevertheless, it is advantageous to use a cell whose constants are stored in memory. This will avoid the possibility of entering incorrect constants that will generate incorrect weight readings.

What is claimed is:

1. A system to calculate weight parameters of an aircraft comprising:

a plurality of strain gauge load cells sensed by direct current voltage means providing analog voltage outputs in proportion to the load on each load cell, said plurality of load cells being placed intermediate different portions of the aircraft and a solid, earth-referenced surface;

means to convert the analog voltage outputs from the load cells into digital signals;

memory storage means to retain data descriptive of the configuration of the aircraft, a portion of such data being pre-programmed in the memory storage means and addressable via labelling indicative of particular aircraft model and series numbers with the remainder of such data being entered by an operator of the system in the event the required data was not pre-programmed; and computation means to convert the digital signals essentially simultaneously into output information of load on a single load cell, or aircraft gross weight, or aircraft center of gravity or aircraft center of gravity expressed as a percentage of the mean aerodynamic chord of the aircraft such that load cell outputs which contain not insubstantial non-linear components may be processed by the computation means.

* * * * *